(12) United States Patent
Wright

(10) Patent No.: US 12,351,082 B1
(45) Date of Patent: Jul. 8, 2025

(54) TRACK LOCK MECHANISM

(71) Applicant: Textron Aviation, Inc., Wichita, KS (US)

(72) Inventor: Thomas Andrew Wright, Wichita, KS (US)

(73) Assignee: TEXTRON INNOVATIONS INC., Providence, RI (US)

( * ) Notice: Subject to any disclaimer, the term of this patent is extended or adjusted under 35 U.S.C. 154(b) by 1 day.

(21) Appl. No.: 18/404,453

(22) Filed: Jan. 4, 2024

(51) Int. Cl.
*B60N 2/08* (2006.01)

(52) U.S. Cl.
CPC ...................................... *B60N 2/08* (2013.01)

(58) Field of Classification Search
None
See application file for complete search history.

(56) References Cited

U.S. PATENT DOCUMENTS

| | | | | |
|---|---|---|---|---|
| 8,628,053 B2 * | 1/2014 | Marechal | ........... | B64D 11/0696 244/118.6 |
| 8,882,037 B2 * | 11/2014 | Marechal | ........... | B64D 11/0696 244/118.6 |
| 8,967,570 B2 * | 3/2015 | Parrish | ...................... | F02K 1/80 248/694 |
| 10,562,411 B2 * | 2/2020 | Higuchi | ..................... | F16H 1/20 |
| 10,583,752 B2 * | 3/2020 | Higuchi | ................. | B60N 2/075 |
| 11,760,233 B2 * | 9/2023 | Napau | .................. | B60N 2/0825 296/65.15 |
| 12,151,596 B2 * | 11/2024 | Zhao | ..................... | B60N 2/0732 |
| 2010/0243852 A1 * | 9/2010 | Muraishi | .............. | B60N 2/0715 248/429 |
| 2012/0145867 A1 * | 6/2012 | Benthien | ................ | B60N 2/072 248/429 |

\* cited by examiner

*Primary Examiner* — Steven M Marsh
(74) *Attorney, Agent, or Firm* — SLATER MATSIL, LLP

(57) ABSTRACT

A position locking apparatus for a seat includes a track, a lock housing, a piston, a shaft, and a cam. The track has track teeth. The lock housing has a slot. The piston has piston teeth on a first distal end, which is configured to slide in the slot. The cam is attached to the shaft and the shaft pivotably couples with the lock housing. The cam is configured to contact a second distal end of the piston to press the piston towards the track such that the piston teeth engage with the track teeth to lock a position of the track relative to the piston and the lock housing in response to the cam being pivoted in a first angular direction via the shaft.

20 Claims, 17 Drawing Sheets

TRACK LOCK MECHANISM

TECHNICAL FIELD

The present disclosure relates generally to a system for locking a position of a track, and in particular, to a lock mechanism for releasably fixing a track for a seat positioning system.

BACKGROUND

A prior locking mechanism for adjusting a position of an aircraft seat utilized two teethed locking chucks, one chuck for restricting movement of the seat position for each direction. One chuck restricts forward movement and another chuck restricts backward movement, for example. As another example, one chuck restricts left direction movement and another chuck restricts right direction movement. A disadvantage of such prior locking mechanism is the added weight, added materials cost, and added manufacturing cost for having one locking chuck per direction of movement restriction.

A prior locking mechanism used locking chucks held in place by a wedging force due to a linear motion of the locking mechanism and its kinematics. This prior design inherently has some free play that occurs while the locking chucks are engaged or during the engagement. It is a disadvantage for the locking mechanism to have free play during engagement because it gives a less precise feel to the user when adjusting a seat position. It is also a disadvantage to have free play in the seat position, as this could be a source of unwanted vibrations to the person using the seat during flight, as well as a source of rattling noise, which could portray a lower quality for a user experience.

Another disadvantage of such prior locking mechanism is the linear force vectors applied to the locking mechanism for restricting movement, based on the kinematics and configuration of such mechanism, push the locking chuck in a direction towards disengagement. Back drive occurs when the force applied on the seat track is great enough to wedge the lock chuck, via interfacing teeth, toward a disengaged position, allowing the track to skip teeth engagement and move, or even cause damage to the teeth and the lock mechanism. To prevent back drive, the spring force applied on the locking mechanism to keep teeth of the locking chuck engaged with teeth on the track must be large enough to overcome typical forces translated to the locking chuck via the seat track, such as by a person sitting and such as during turbulence and hard landing scenarios. It is a disadvantage to require a strong spring force to retain engagement of the locking mechanism and to prevent back drive because it requires larger and heavier springs. Also, a disadvantage of prior locking mechanism is the large spring force that must be overcome by a person during adjustment of the seat position. This could be a disadvantage to persons with weaker or injured hands due to the larger handle force required by the user to disengage the locking mechanism, for example. Also, this could make the user experience in adjusting the seat uncomfortable, even for a sufficiently strong and fit person. Furthermore, the strong spring action could be a safety hazard, as a strong pinch point for fingers.

SUMMARY

An embodiment position locking apparatus for a seat includes a track, a lock housing, a piston, a shaft, and a cam. In the embodiment, the track extends along a track axis and has a set of track teeth disposed along a first side of the track. In the embodiment, the lock housing has a slot formed therein. In the embodiment, the piston has a first distal end and a second distal end, a set of piston teeth is disposed on the first distal end of the piston, and the piston is configured to slide in the slot to engage the first distal end of the piston with the track and engage the piston teeth with the track teeth and further configured to disengage the first distal end of the piston from the track. In the embodiment, the shaft extends along a shaft axis, and the shaft is pivotably coupled to the lock housing. In the embodiment, the cam is attached to the shaft, the cam is adjacent the second distal end of the piston, the cam is configured to contact the second distal end of the piston, and the cam is configured to press the piston towards the track such that the set of piston teeth engage with a subset of the set of track teeth to lock a position of the track relative to the piston in response to the cam being pivoted in a first angular direction about the shaft axis via the shaft.

An embodiment rail lock apparatus includes a rail, a lock housing, a lock piston, a shaft, a lock cam, a first lock piston spring, a lever, and a lever spring. In the embodiment, the rail has rail teeth formed on a first side of the rail. In the embodiment, the lock piston slidably couples with, and is supported by, the lock housing. In the embodiment, the lock piston has teeth formed on a distal end of the lock piston. In the embodiment, the shaft pivotably couples with, and is supported by, the lock housing. In the embodiment, the lock cam mechanically couples to the shaft. In the embodiment, the first lock piston spring is disposed between the lock piston and the lock housing, and the first lock piston spring is configured to press the lock piston against the lock cam. In the embodiment, the lever is mechanically coupled to the shaft, such that the shaft, the lock cam, and the lever are fixed relative to each other. In the embodiment, the lever spring is disposed to provide spring bias to the lever to pivot the lock cam, via the shaft and via the lever, toward a locked position with the lock piston teeth engaging the rail teeth.

An embodiment method for installing a position locking apparatus for a seat includes providing a track having a track axis, the track having a set of track teeth disposed along a first side of the track, providing a lock housing having a slot formed therein, a first shaft hole formed therein, a second shaft hole formed therein, and a first spring pocket formed therein, inserting a first piston spring into the first spring pocket, inserting a first distal end of a piston into the slot until a second distal end of the piston engages with the first piston spring, where the piston includes a set of piston teeth disposed on the first distal end of the piston, where the piston teeth are configured to engage with the track teeth, and where the piston and the lock housing are configured to allow the piston to slide in the slot to engage the first distal end of the piston with the track and to disengage the first distal end of the piston from the track, inserting a cam in the lock housing between the first shaft hole and the second shaft hole, and adjacent the second distal end of the piston, where the cam includes a cam profile having an increasing radius per pivot angle in a first angular direction about a shaft axis, where the cam and the cam profile are configured to press the piston towards the track to cause the set of piston teeth to engage with a subset of the set of track teeth to lock a position of the track relative to the piston in response to the cam being pivoted in the first angular direction via a shaft, inserting the shaft through the first shaft hole, through the cam, and through the second shaft hole, such that the shaft is pivotably coupled to the lock housing, such that the cam is configured to contact the second distal end of the piston, such that the first piston spring is configured to bias the second distal end of the piston towards the cam and to bias the first distal end of the piston away from the track to disengage the first distal end of the piston from the track, and attaching a lever to the shaft, the lever being configured to pivot the cam via the shaft in response to the lever being pivoted about the shaft axis.

BRIEF DESCRIPTION OF THE DRAWINGS

The above and other features and advantages of the present disclosure can be more apparent based on the following detailed description taken in conjunction with the accompanying drawings, in which.

DETAILED DESCRIPTION OF ILLUSTRATIVE EMBODIMENTS

Figure 1:
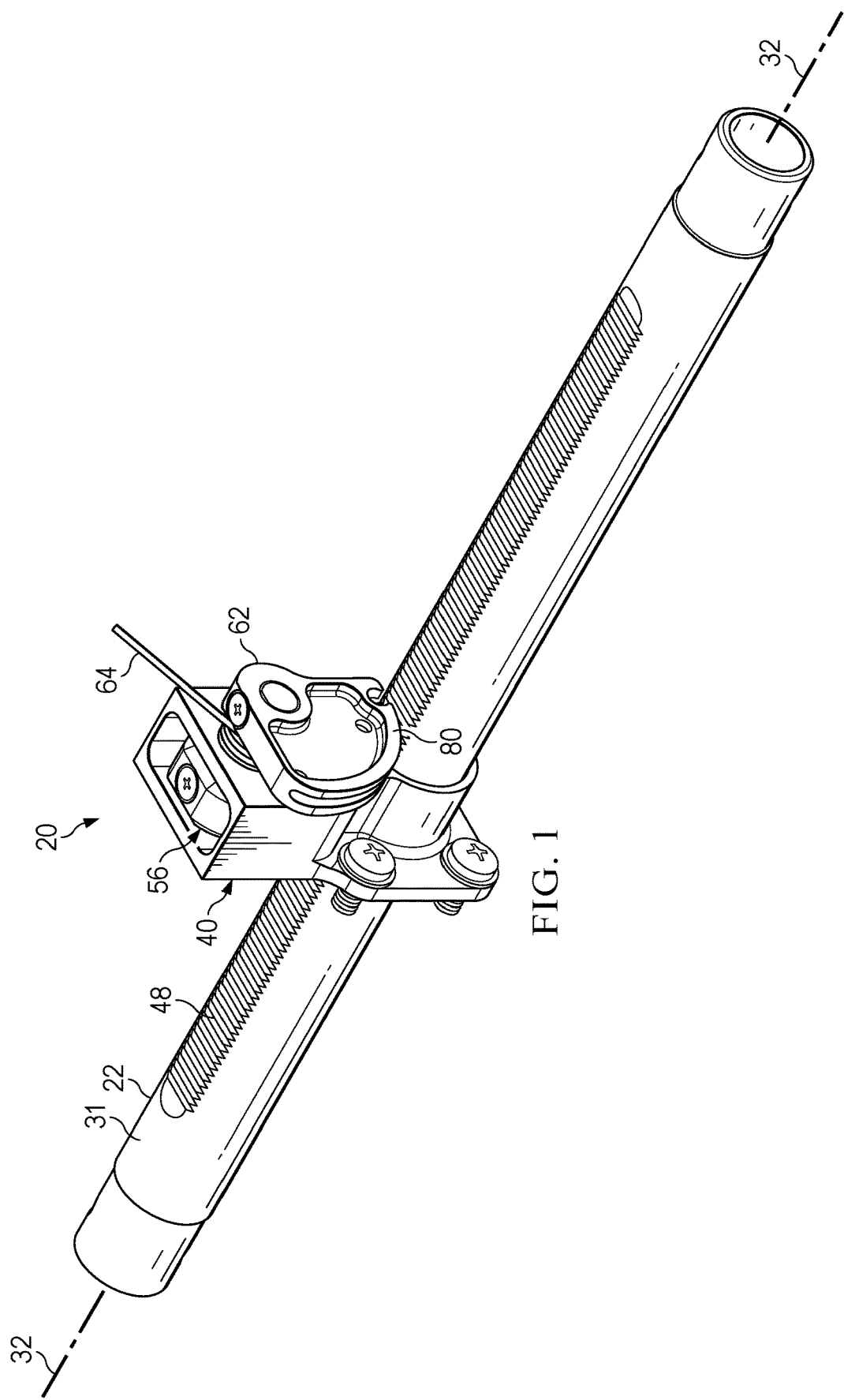
FIGS. 1-3 are perspective views showing partial components of an aircraft seat structure including a locking mechanism according to some embodiments.

Referring now to the drawings, wherein like reference numbers are used herein to designate like or similar elements throughout the various views, illustrative embodiments are shown and described. The figures are not necessarily drawn to scale, and in some instances the drawings can be exaggerated or simplified in places for illustrative purposes only. One of ordinary skill in the art can appreciate many possible applications and variations for other embodiments based on the following illustrative embodiments provided in the present disclosure. Some embodiments are generally in the field of linear motion, and may relate specifically to mechanical locks for linear motion rails.

Figure 2:
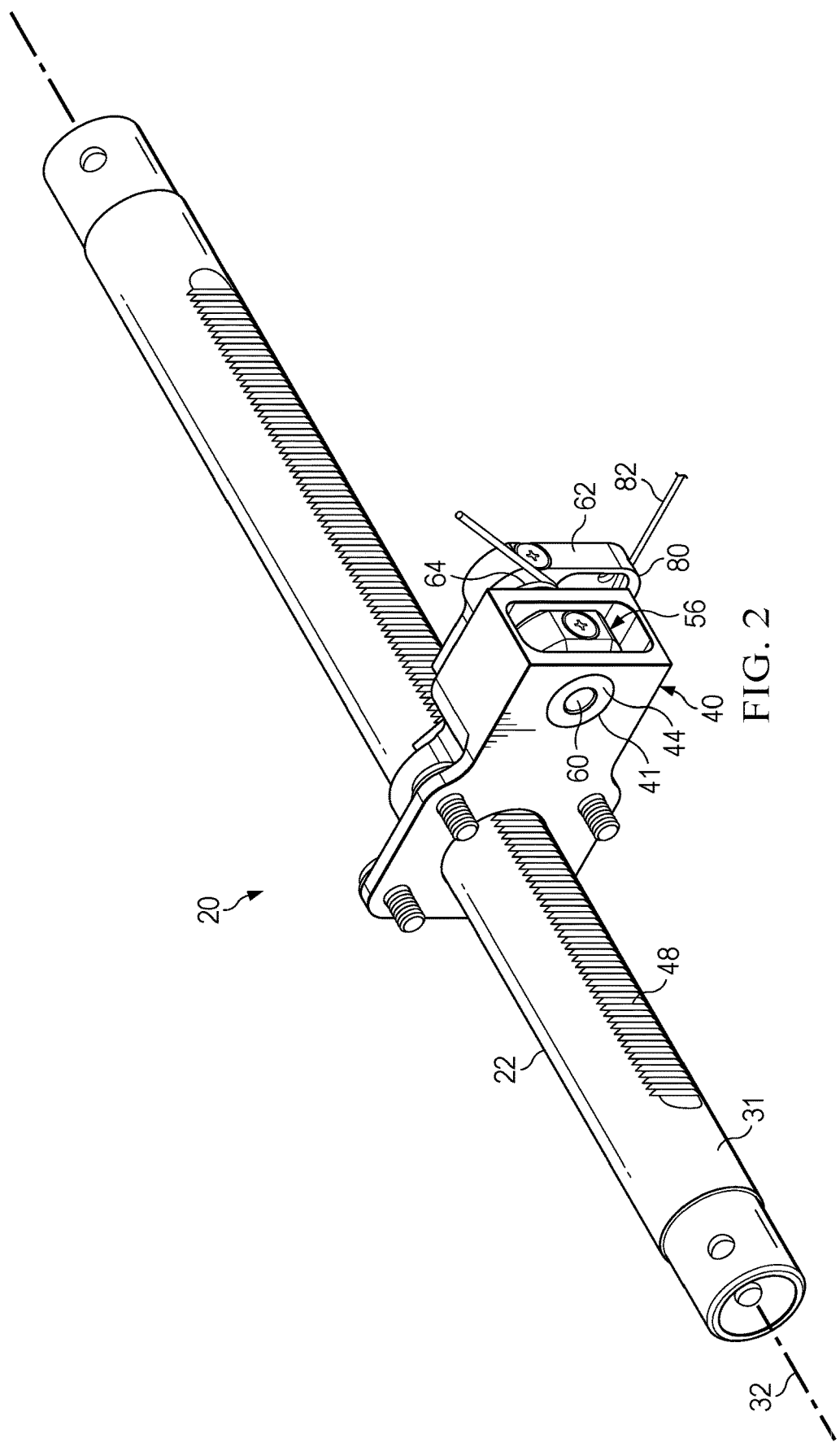
Figure 3:
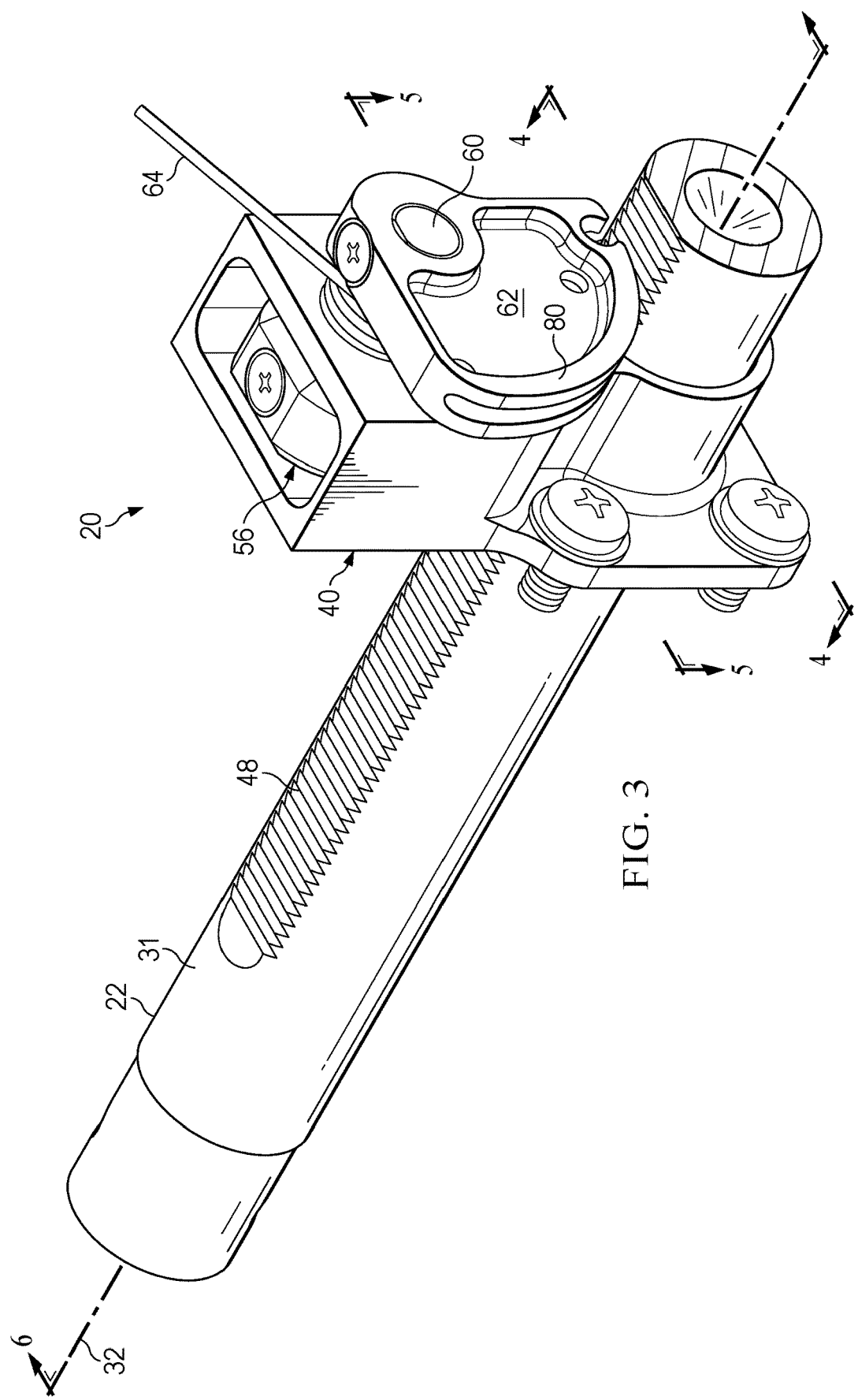
Figure 4:
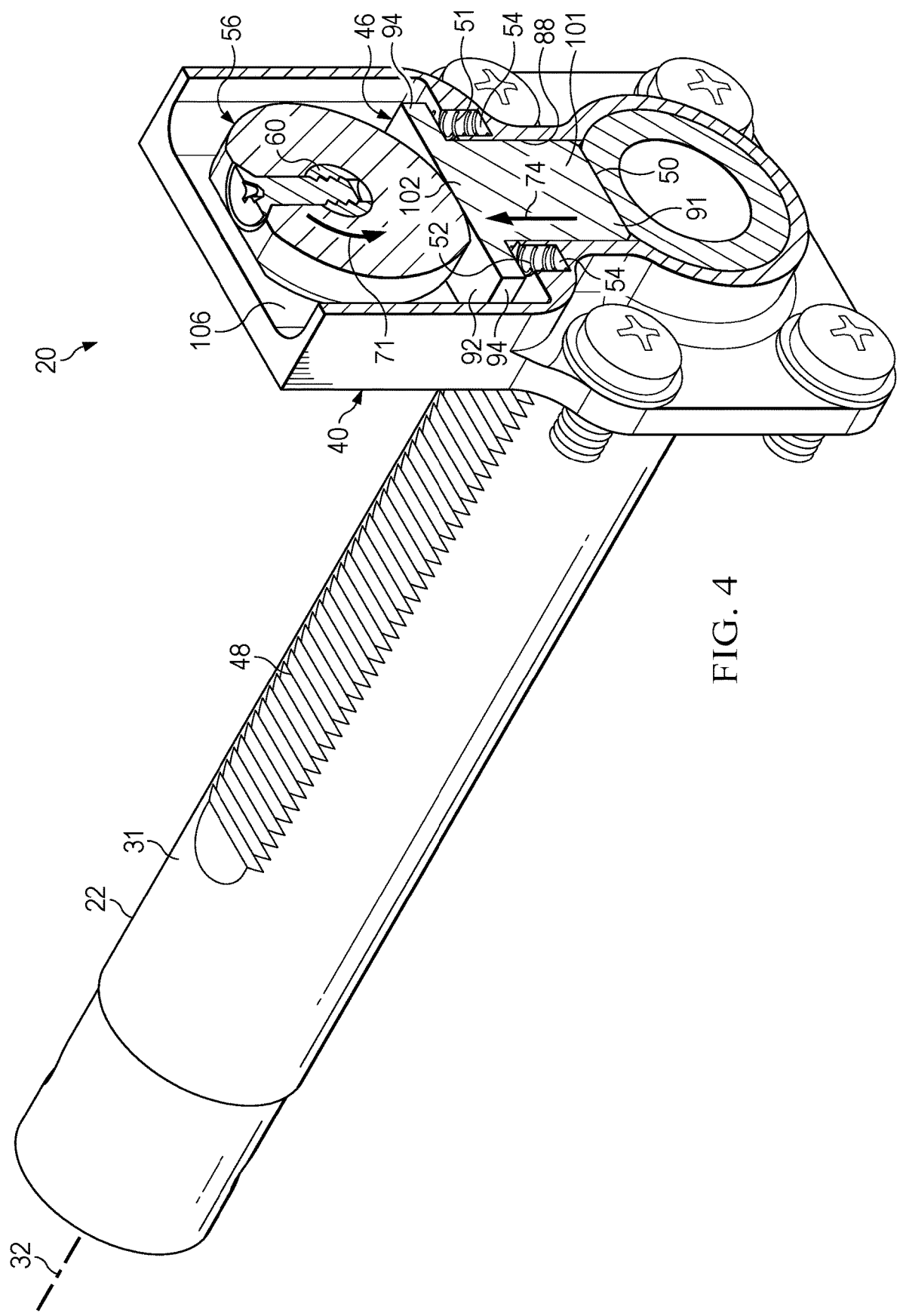
FIG. 4 is a cross-section view of FIG. 3 taken along line 4-4 according to some embodiments.
Figure 5:
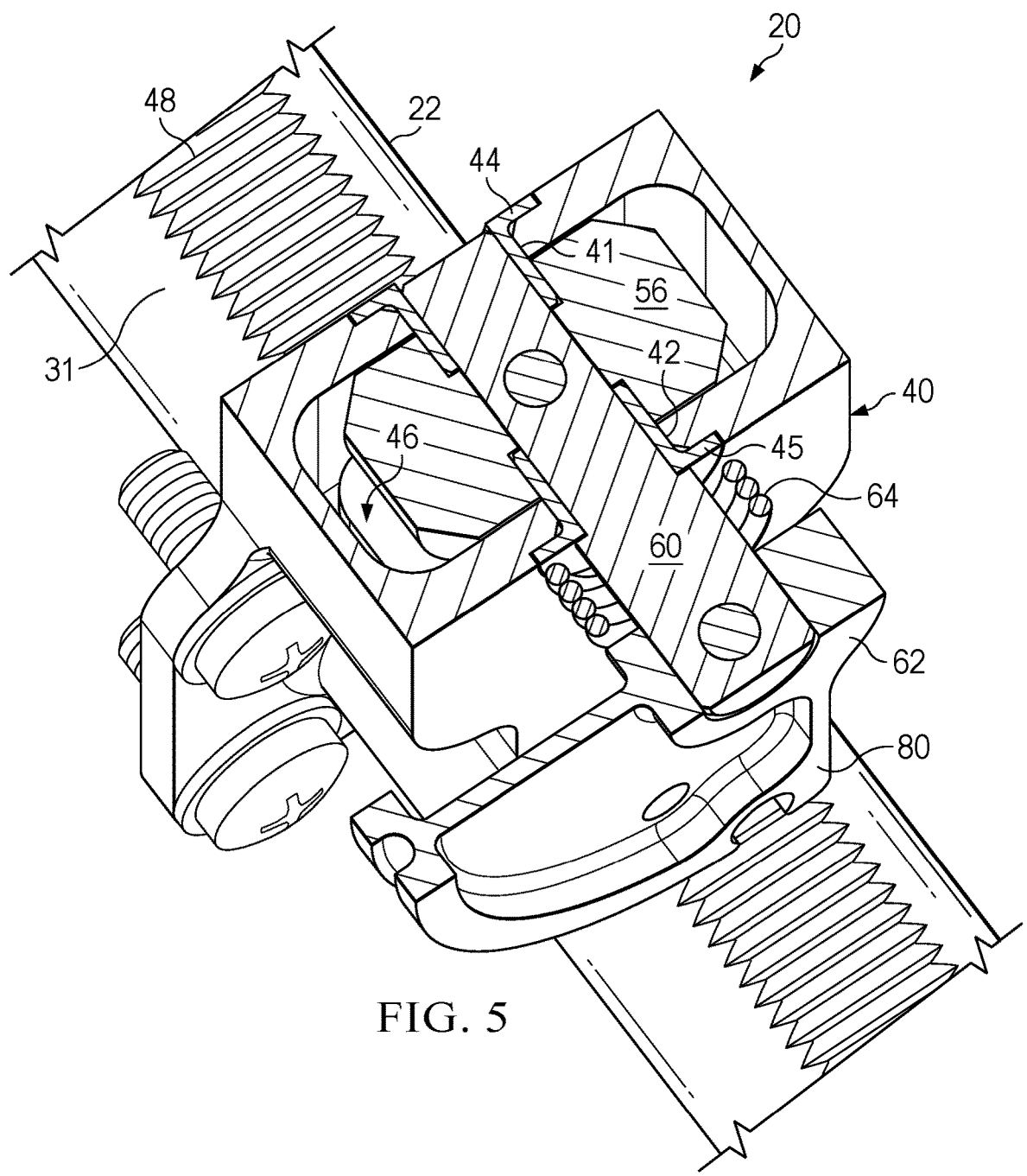
FIG. 5 is a cross-section view of FIG. 3 taken along line 5-5 according to some embodiments.
Figure 6:
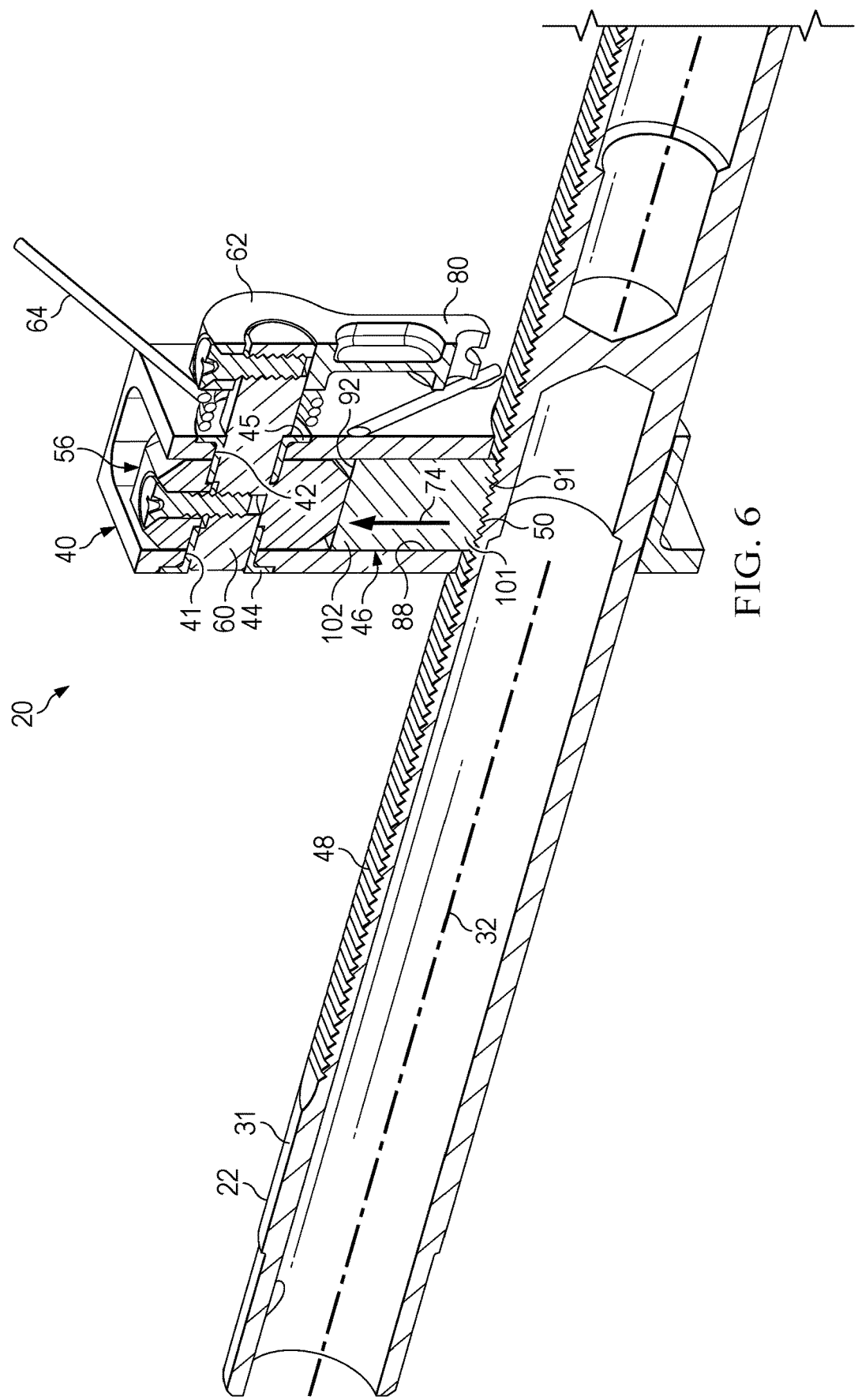
FIG. 6 is a cross-section view of FIG. 3 taken along line 6-6 according to some embodiments.
Figure 7:
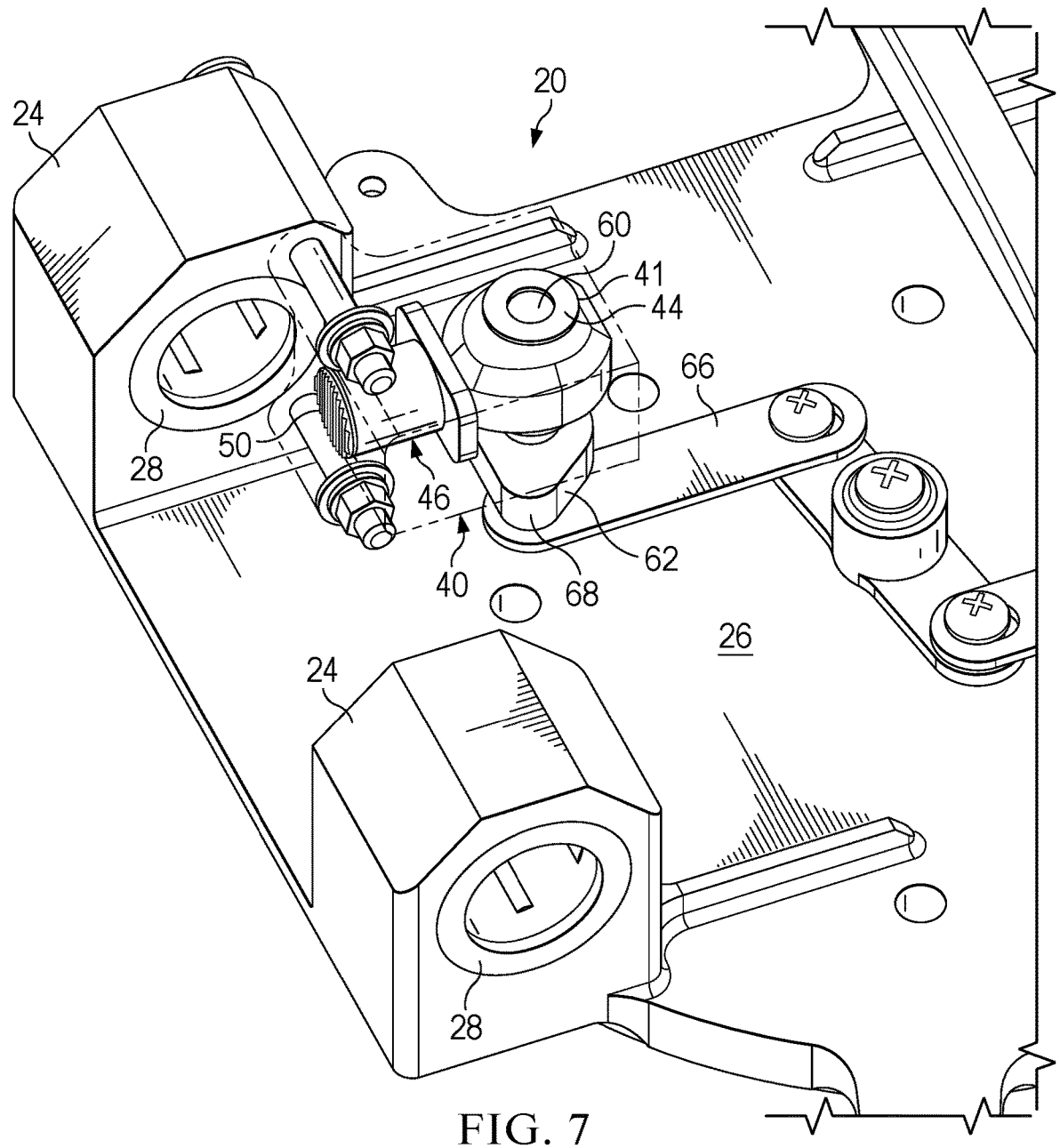
FIG. 7 is a perspective view showing partial components of an aircraft seat structure including a locking mechanism according to some embodiments.

FIGS. 1-3 are perspective views showing partial components of an aircraft seat structure including a locking mechanism 20 according to some embodiments. FIG. 4 is a cross-section view of FIG. 3 taken along line 4-4 and illustrating the locking mechanism embodiment 20 shown in an engaged or locked position. FIG. 5 is a cross-section view of FIG. 3 along line 5-5 and illustrating the locking mechanism embodiment 20 shown in an engaged or locked position from another perspective. FIG. 6 is a cross-section view of FIG. 3 along line 6-6 and illustrating the locking mechanism embodiment 20 shown in an engaged or locked position from yet another perspective. FIGS. 7-10 is a perspective view showing partial components of an aircraft seat structure including a locking mechanism 20 according to some embodiments. FIG. 11 is a cross-section view of FIG. 10 taken along line 11-11 and illustrating a locking mechanism embodiment 20 shown in an engaged or locked position.

In FIGS. 1-11, many other components and parts of the aircraft seat structure are omitted to focus attention on locking mechanism 20 embodiments. The locking mechanism 20 may have a track tube 22, which may be attached to a seat bucket structure of the aircraft seat structure such that the track tube 22 is fixed relative to the seat bucket structure, and a seat structure of an aircraft may have several track tubes and locking mechanisms. Also, the track tube 22 may be slidably coupled to and supported by a swivel plate 26 of the aircraft seat structure via linear bearings 28 and pillow block supports 24, so that the track tube 22 may be movable along a track axis 32 relative to the swivel plate 26, for example. The locking mechanism 20 of FIGS. 1-11 has a lock housing 40, which may be attached to the swivel plate 26 of the aircraft seat structure using bolts or screws, for example. The lock housing 40 may be bolted to a pillow block support 24 of the swivel plate 26. In some embodiments, the track tube 22 may be made from stainless steel tubing and the lock housing 40 may be made from CNC machined aluminum billet, for example.

Although example embodiments used in an aircraft seat structure are discussed herein, some embodiments may be adapted or configured to be used for other applications and uses, as may be apparent to one of ordinary skill in the art to which the present disclosure pertains, such as automobile seat structures, spacecraft seat structures, train seat structures, construction equipment seat structures, furniture seat structures, or non-seat structures, for example. The track tube 22 may provide the interface between a seat bucket structure and the swivel plate 26 in an aircraft seat structure, for example. The swivel plate 26 of a seat structure may be where loading on the seat bucket, such as be a person using the seat, is transferred under various directional loads.

The track tube 22 may be supported by linear ball bearings 28 mounted in the swivel plate 26, for example. Linear bearings 28 may be inserted into the pillow block supports 24 to allow the track tube 22 to freely move or slide along a track tube axis 32 in two directions, such as left and right, up and down, forward and backwards, depending on the orientation of the swivel plate 26 or the orientation and placement of a seat structure. When discussing a locking mechanism embodiment 20, the swivel plate 26 may be considered as or treated as a static reference frame in a loading analysis and in a kinetic operation of the mechanisms, for example. The pillow block supports 24 may be integral with the swivel plate 26, or may be separate components attached or fixed to the swivel plate 26, such as by using screws, bolts, rivets, adhesive, snaps, clips, clamps, press fit, hook-and-loop fasteners, latches and catches, bayonet, thermal bonding, crimping, threaded inserts, welding, or any combination thereof, for example. In some embodiments, the pillow block supports 24 and the swivel plate 26 may be made from CNC machined aluminum billet, for example.

In some embodiments, a portion of the lock housing 40 may surround the track tube 22, while in some embodiments, the track tube 22 may not extend through the lock housing 40 and the lock housing 40 may be merely adjacent the track tube 22. When the lock housing 40 partially or fully surrounds the track tube 22, the lock housing 40 may not touch the track tube 22 and in some embodiments the track tube 22 may be at least partially supported by the lock housing 40 via a bearing or bushing, for example.

Although the track tube 22 is shown as a tubular structure in the drawings, the track tube 22 may be a rail, shaft, or beam, and may have any suitable cross-section shape, such as I-shaped, C-shaped, H-shaped, L-shaped, square, rectangular, triangular, or oval, for example. An advantage of having a track tube 22 with a tubular shape may be the use of circular-shaped bearings or bushings to slidably support the track, or options for manufacturing the track, which may reduce manufacturing costs or reduce manufacturing time. A tubular track shape may also reduce weight compared to other shape options.

In some embodiments, the lock mechanism 20 provides a way to lock a position of the track tube 22 relative to the swivel plate 26 or other components of the seat structure. In some embodiments, the lock mechanism 20 provides a way to unlock a position of the track tube 22 to allow the track tube 22 to move, translate, and slide relative to the swivel plate 26 and/or other components of the seat structure, such as for adjusting a seat position, for example.

In some embodiments, the lock housing 40 of the lock mechanism 20 ties the components together as support while providing positional and location relationships among the components working together to provide the kinematics of the lock mechanism 20. The lock housing 40 may support and position bushings 44, 45, a piston 46, piston springs 51, 52, a cam 56, a shaft 60, a lever 62, and a lever spring 64, for example.

In some embodiments, a lock mechanism 20 may lock the track tube 22 in a particular position, and thereby a position of a seat bucket attached to the track tube 22, by piston teeth 50 of a piston 46 engaging with a subset of track teeth 48 formed along a first side 31 of the track tube 22. The piston 46 may be pressed against the track tube 22 by a cam 56. The cam 56 may be supported by a shaft 60, and the shaft 60 may be supported by the lock housing 40, such that the cam 56 can pivot about a shaft axis 61 of the shaft 60. The cam 56 may have a cam profile with an increasing radius per pivot angle in a first angular direction 71 about the shaft axis 61. The cam 56 and the cam profile may be configured to press the piston 46 towards the track tube 22 when the cam 56 is pivoted in the first angular direction 71 via the shaft 60. A lever 62 may be attached to the shaft 60 for actuating the pivot of the shaft 60. A set of piston springs 51, 52 may press the piston 46 against the cam 56 to maintain contact with the piston 46 and so that the piston 46 moves according to the cam profile. The piston springs 51, 52 bias the piston 46 in a disengagement direction 74 away from the track tube 22 so that as the cam profile radius decreases, as the cam 56 pivots in a second angular direction that is opposite the first angular direction 71, the piston 46 moves in the disengagement direction 74 and the piston teeth 50 begin to disengage from the track teeth 48. As the lever 62 continues to pivot the shaft 60 in the second angular direction, the radius on the cam profile continues to decrease, the piston springs 51, 52 continue to press the piston 46 in the disengagement direction 74, until eventually there is no interference or no engagement between the piston teeth 50 and the track teeth 48, thereby freeing the track tube 22 to move, translate, or slide relative to the piston 46, lock housing 40, and swivel plate 26 of the seat structure, which provides a disengaged position of the locking mechanism 20.

To lock the position of the track tube 22, such as after adjusting the seat position to suit a seat user, the lever 62 may pivot the shaft 6o in the first angular direction 71. As the shaft 60 pivots in the first angular direction 71, the radius of the cam profile increases, the cam 56 pressing on the piston 46 overcomes the force of the piston springs 51, 52, the piston 46 moves in an engagement direction toward the track tube 22, until eventually there is a mating or engagement of the piston teeth 50 with a subset of the track teeth 48, thereby locking or releasably fixing the track tube 22 relative to the piston 46, the lock housing 40, and the swivel plate 26 of the seat structure, or thereby preventing the track tube 22 from moving, translating, or sliding along the track axis 32 relative to the piston 46, the lock housing 40, and the swivel plate 26 of the seat structure.

A set of track teeth 48 may be formed along a first side 31 of the track tube 22. The track teeth 48 may have an angle of 90 degrees and may be formed using a fixture angled at 45 degrees so that a cutting tool with a 90 degree angled tip can cut each tooth gap, step up and then cut another tooth gap, continuing until there is a set of track teeth 48 formed generally along the track axis 32 and along a first side 31 of the track tube 22. Other angles for the track teeth 48 may be used and other manufacturing methods may be used to form the track teeth 48. An advantage of using the 90-degree teeth 48 may be that the manufacturing cost is less and faster compared to other angles. Other tooth angles, such as 70-degree teeth, may provide an advantage of greater teeth interface area and less likelihood of back drive due to axial forces exerted along the track axis 32 being translated to forces driving the piston 46 away from the track tube 22 via the teeth 48, 50. However, other tooth angles, such as 70-degree teeth, may have greater manufacturing costs or slower manufacturing times, for example. Also, a 70-degree tooth design may have a greater disengagement distance to provide clearance for the track tube 22 to freely move than that of a 90-degree tooth design, for example. Thus, the tooth design and angle used may have various design choice tradeoffs to consider for a given embodiment.

The lever 62 may be pivoted by a linkage 66 pushing or pulling on the lever 62, or on a lever arm 68 of the lever 62. Such linkage 66 may be controlled by or moved using a force generated by a person pulling or pushing a seat adjustment lever, for example. Such linkage 66 may be controlled by or moved by using a force generated by an actuator, such as a solenoid, a servo, an electric motor, a hydraulic piston, a spring, another device, or some combination thereof, for example.

The lever 62 may include a cable pulley portion 80 having one or more cables attached thereto. For example, a cable 82 may be used to actuate the lever 62 in the first angular direction 71 or in the second angular direction. For example, two cables may be used to actuate the lever 62, one cable for pulling the lever 62 in the first angular direction 71 for engagement or locking, and another cable for pulling the lever 62 in the second angular direction for disengagement or unlocking. In some embodiments, a linkage 66 and lever arm 68 may be preferred over a cable 82 because cables tend to stretch over time and need adjustment maintenance. However, a cable pulley 80 provides an advantage of providing a constant tangential force applied to the lever 62, if the pulley 80 has a constant radius, and a constant pull force on the cable 82 for actuating the cam 56 because the moment arm on the lever 62 can be a constant radius. Thus, the lever design, shape, kinematics, and mechanism used may have various design choice tradeoffs to consider for a given embodiment.

In some embodiments, a lever spring 64 may be used to bias the lever 62 toward pivoting in the first angular direction 71 for engagement or locking. In such case, to move the lever 62 and to retain a locked position, the lever spring 64 may be sized and designed to overcome the forces of the piston springs 51, 52, the friction or stiction of the shaft 60, the friction or stiction between the cam 56 and the piston 46, the friction or stiction for sliding the piston 46 in the lock housing 40, and for overcoming anticipated back drive forces exerted on the piston 46 by the wedging forces applied to the piston teeth 50 by the track teeth 48 as force is exerted on the track tube 22 along the track axis 32. The lever spring 64 may provide a force of about one pound on the lever 62, for example. Each of the piston springs 51, 52 may provide a force of about 0.1 pound on the piston 46, for example. The force of the piston springs 51, 52 increases the friction between the cam 56 and the second distal end 92 of the piston 46. Thus, as the spring force of the piston springs 51, 52 is increased, the size of the cam pivot spring or lever spring 64 may be increased because the friction force is increased.

Figure 8:
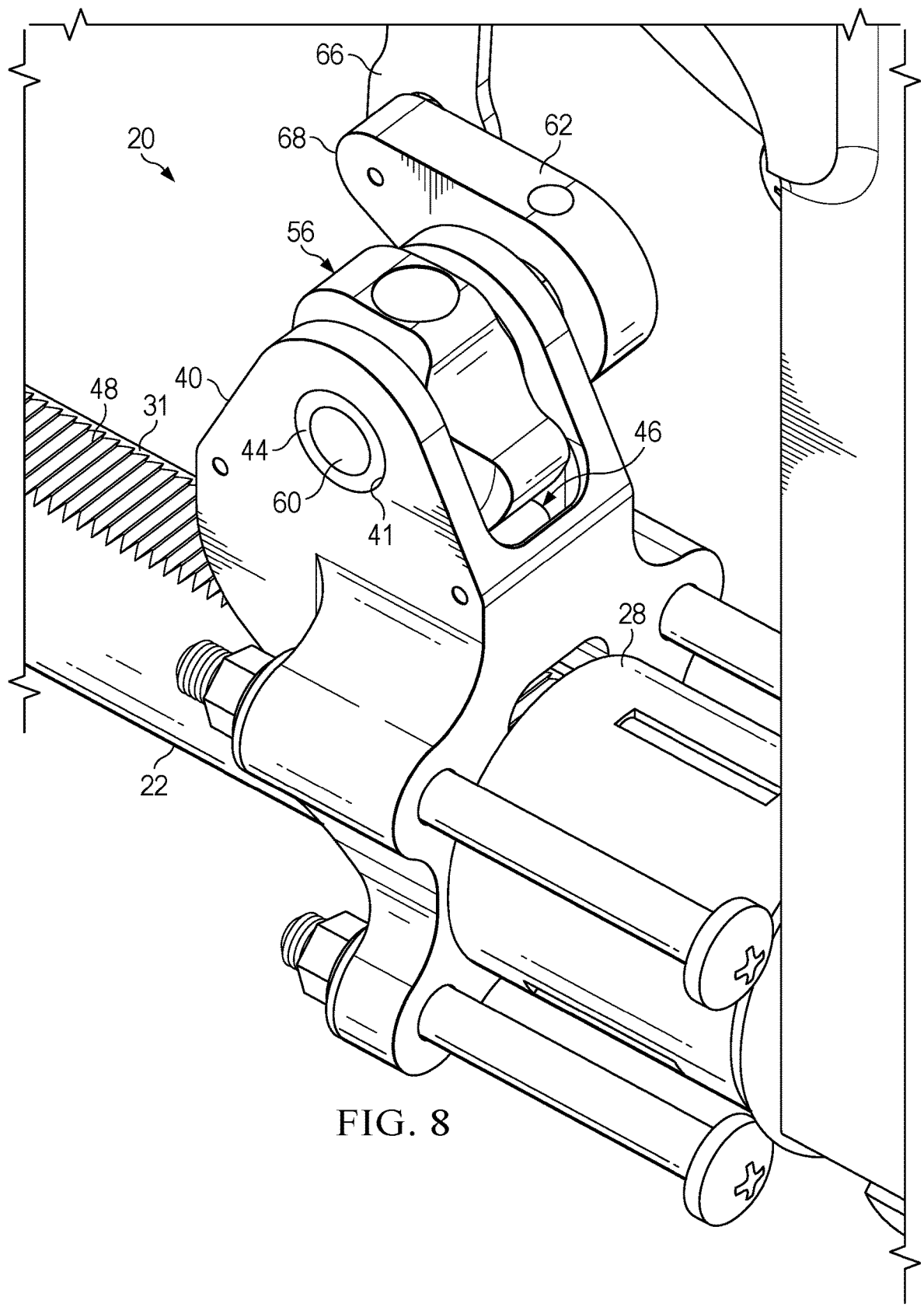
FIGS. 8-10 are perspective views showing partial components of an aircraft seat structure including a locking mechanism according to some embodiments.
Figure 9:
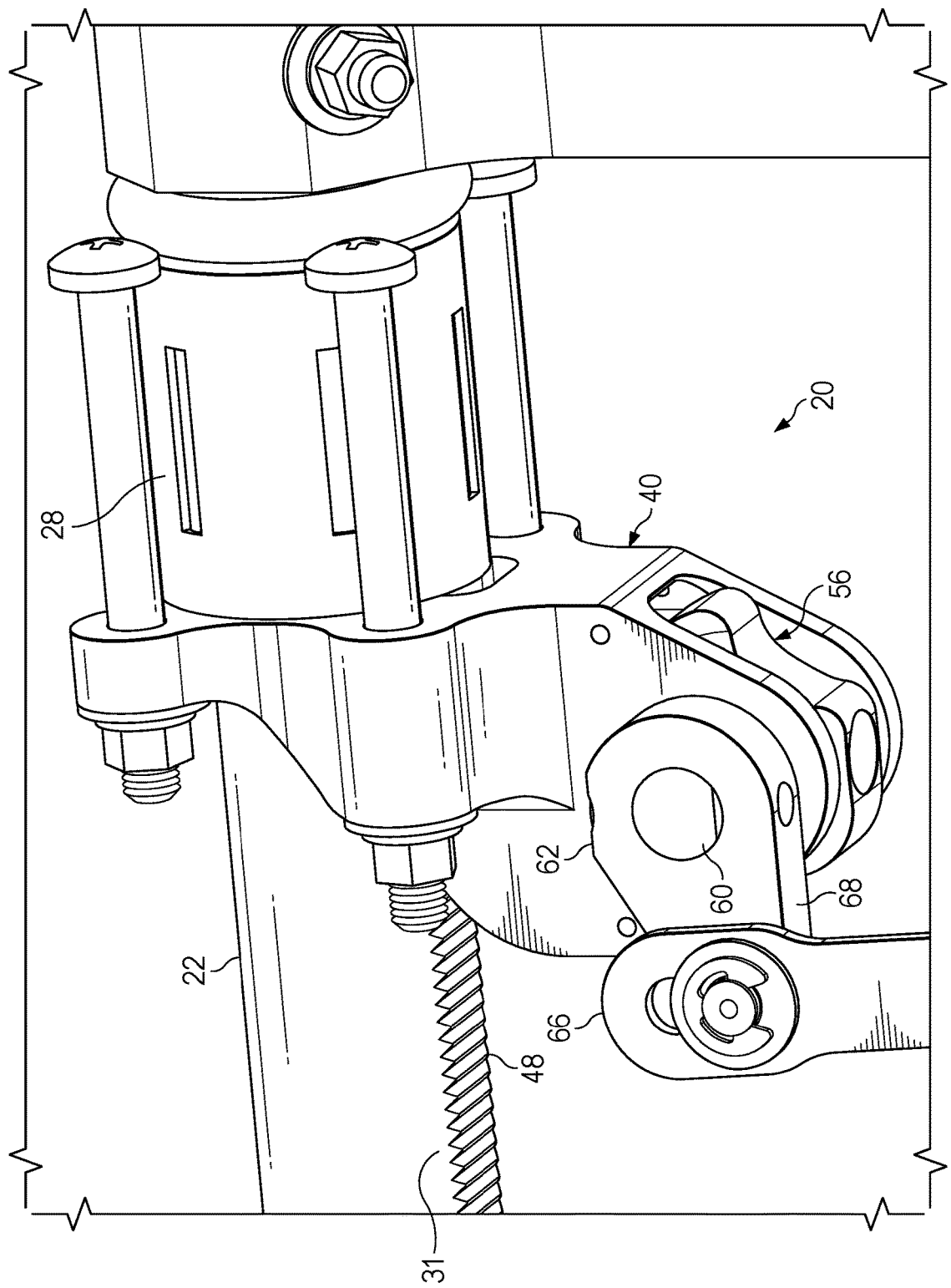
Figure 10:
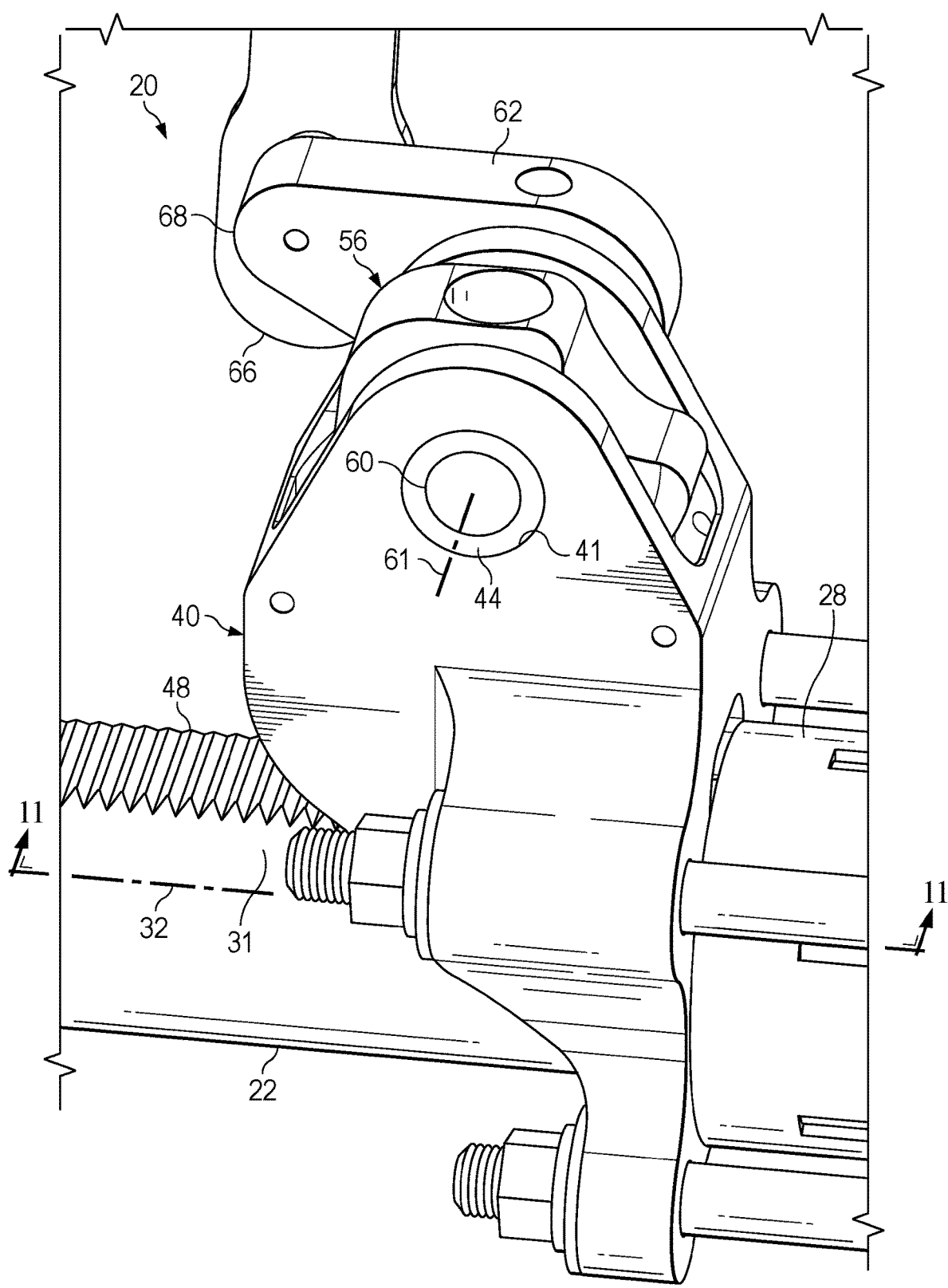
Figure 11:
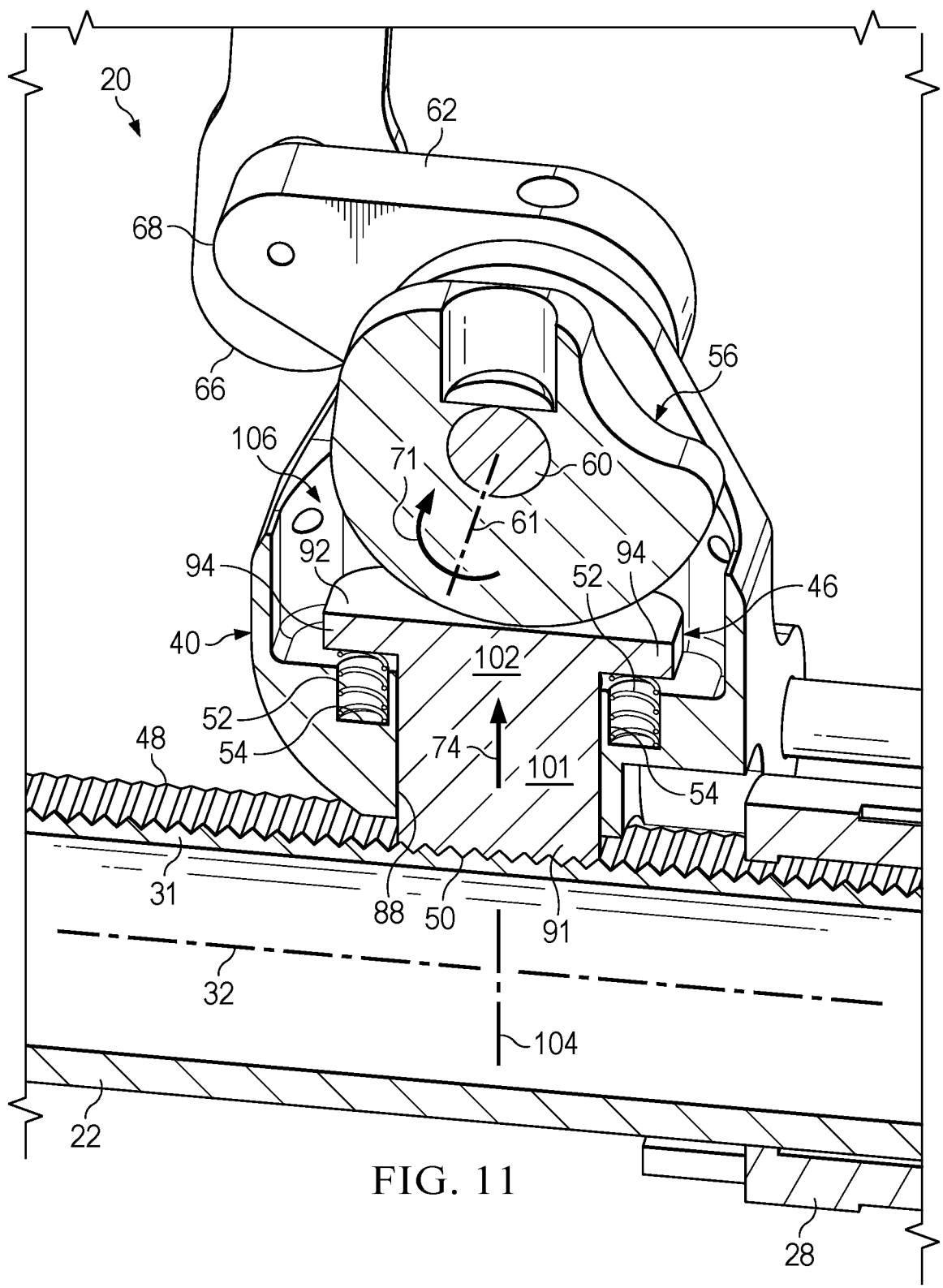
FIG. 11 is a cross-section view of FIG. 10 taken along line 11-11 according to some embodiments.
Figure 12A:
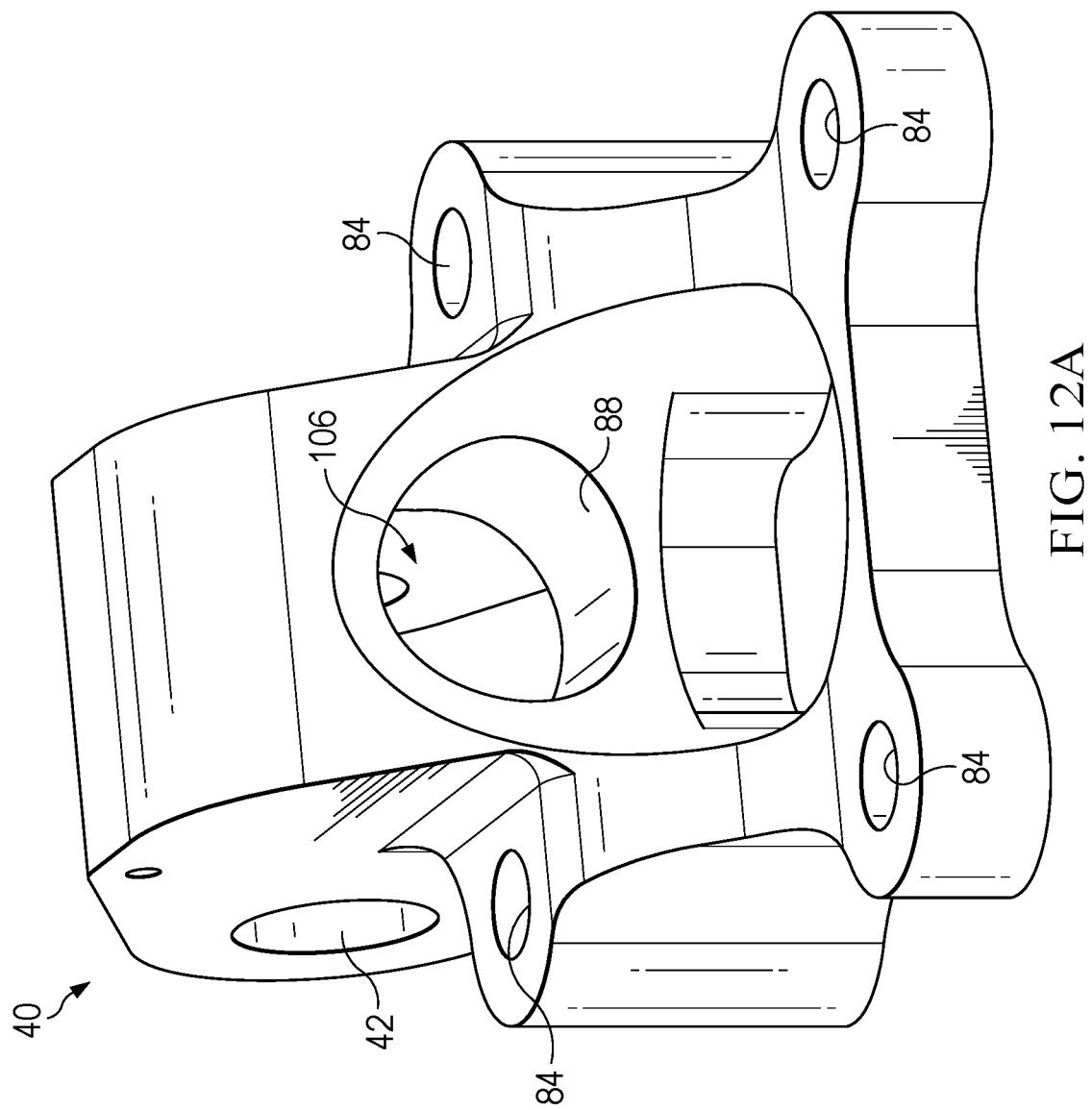
FIGS. 12A and 12B are perspective views of the lock housing of FIGS. 8-10 according to some embodiments.
Figure 12B:
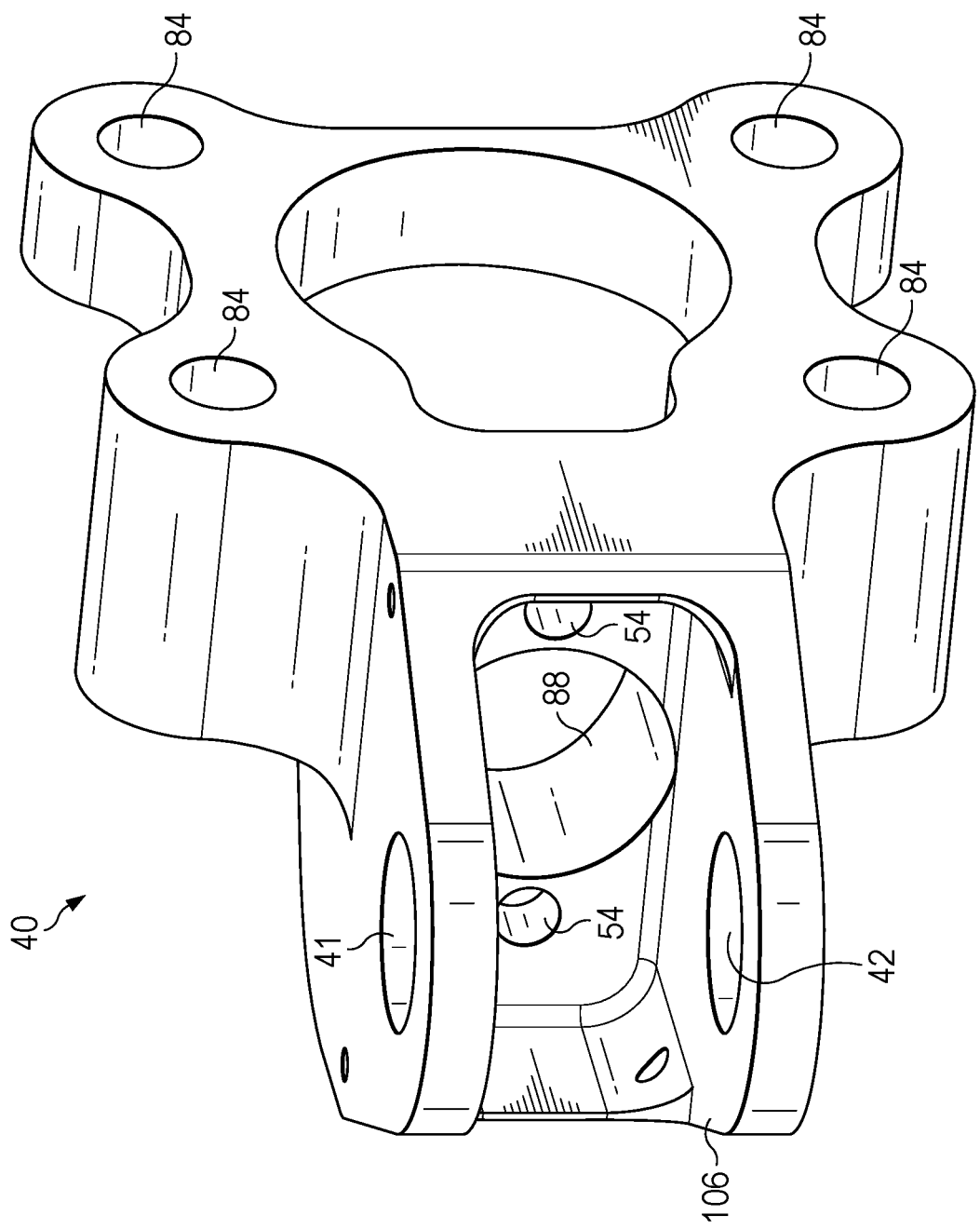

FIGS. 12A and 12B are perspective views of the lock housing 40 of FIGS. 8-10 according to some embodiments. The lock housing 40 may have a first shaft hole 41 and a second shaft hole 42. A first bushing 44 may be placed in the first shaft hole 41, and a second bushing 45 may be placed in the second shaft hole 42. The shaft 60 may be placed through and be supported by the bushings 44, 45. The cam 56 may be adjacent or overlapping with the bushings 44, 45, and the cam 56 may be partially supported by the bushings 44, 45, as illustrated in FIG. 5, for example. In some embodiments, bearings or other types of bushings, guides, or spacers may be used in place of or in addition to the bushings 44, 45, for example.

The lock housing 40 may have spring pockets 54 for receiving, partially retaining, and positioning the piston springs 51, 52. The lock housing 40 has a set of mounting holes 84 for securing the lock housing 40 to a pillow block support 24 of a swivel plate 26 using bolts, for example. The lock housing 40 may have a slot 88 with a circular cross-section for receiving, supporting, and providing a slider interface or mechanism with and for the piston 46. The various holes and slots formed in the lock housing 40 may be formed using drill bits or end mills in a CNC machine tool, for example.

Figure 13:
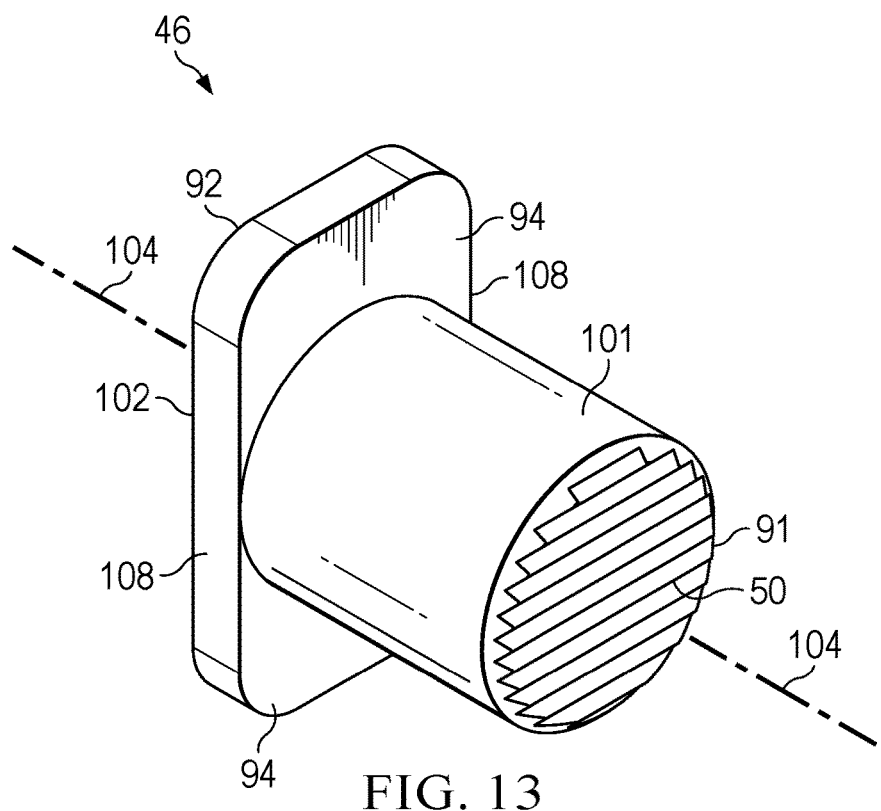
FIG. 13 is a perspective view of the piston of FIGS. 8-10 according to some embodiments.

FIG. 13 is a perspective view of the piston 46 of FIGS. 8-10 according to some embodiments. The piston 46 may have a first distal end 91 having a set of piston teeth 50 formed therein or thereon. The piston teeth 50 may be adapted to or configured to mate with or engage with the track teeth 48. Accordingly, the piston teeth 50 may include 90-degree teeth, which may be manufactured in a same way or in a similar way as the track teeth 48. Alternatively, the piston teeth 50 may be formed in any suitable CNC machine tool. A first portion 101 of the piston 46 including the first distal end 91 with the piston teeth 50 may have a cross-section shape adapted to or configured to slidably couple with or slidably fit with the slot 88 formed in the lock housing 40. The first portion 101 of the piston 46 or the inner surface of the slot 88 may be coated with a layer or insert of material providing a relatively lower friction coefficient compared to the materials of the piston 46 and the lock housing 40, to provide for more freedom of movement and less stiction for the piston 46 to slide within and linearly translate within the slot 88 of the lock housing 40. There are design choices and tradeoffs when selecting materials of the components, tolerances, and spring forces, which may depend upon each other. The slot 88 of the lock housing 40 and the first piston portion 101 may both have a circular slot cross-section, and the circular slot cross-section may have a larger diameter than the circular piston cross-section, by a tolerance that may provide minimal movement of the piston 46 when the piston 46 is engaged with the track tube 22 to reduce play or loose movement of the locked track tube 22, while still allowing for the piston 46 to slide sufficiently for the functioning of the lock mechanism 20.

The piston 46 shown in FIG. 13 and the slot 88 shown in FIGS. 12A and 12B have a circular cross-section, which provides advantages such as lower manufacturing cost for providing four-place dimension accuracy and optimizing tolerances and reduced manufacturing time. The first piston portion 101 and the slot 88 of the lock housing 40 may have any suitable cross-section shape, such as rectangular, square, rectangular with rounded corners, or oval, for example. The piston 46 may be configured to slide in the slot along a piston axis 104, and the piston axis 104 may be generally perpendicular to the track axis 32, and the shaft axis 61 may be generally perpendicular to the piston axis 104.

The piston 46 may have a second distal end 92 that is larger than the first distal end 91, which may limit the motion extent of the piston 46 in the slot 88 of the lock housing 40. As illustrated in FIG. 13, the piston 46 may be generally T-shaped. And as illustrated in FIG. 13, the second distal end 92 of the piston 46 may have a generally rectangular shape with rounded corners. The second distal end 92 may have two lateral portions 94 that extend laterally from the first piston portion 101. These two lateral portions 94 may provide a platform and surface for the piston springs 51, 52 to interact with and press against while the piston springs 51, 52 bias or force the piston 46 in a disengagement direction 74. The second distal end 92 also may provide a surface for the cam 56 to interact with and press against while the cam profile controls motion of the piston 46 and presses or forces the piston 46 in an engagement direction, such as during a locking action of the lock mechanism 20.

For some embodiments, such as illustrated FIGS. 8-13, the second piston portion 102 may be adapted and configured to slide within a spaced gap or larger slot 106 in the lock housing 40 such that there is a standard tolerance between the second distal end 92 of the piston 46 and the lock housing 40, such that the second piston portion 102 or second distal end 92 of the piston 46 controllably slides within the lock housing 40, and such that the tolerance between the second piston portion 102 or second distal end 92 and the gap or larger slot 106 of the lock housing 40 retains a rotational position of the piston 46. Retaining a rotational position of the piston 46 relative to the lock housing 40 may provide an alignment for the piston 46 and the piston teeth 50 to ensure that the piston teeth 50 sufficiently align with the track teeth 48 during use or operation of the lock mechanism 20. Thus, as second portion of the piston 102 at the second distal end 92 of the piston 46 may provide multiple functions of receiving force from the piston springs 51, 52, receiving force and friction from the cam 56, and retaining a rotational position of the piston 46.

The piston 46 may have any cross-section shape, but the circular cross-section may be preferred because the hole or slot 88 in the lock housing 40 may be drilled with high precise tolerance, such as four decimal-place dimensions in an inch scale, using lower cost manufacturing tooling. Hence, the measurement may be accurate to four decimal places, and any variations within those four decimal places may be within a specified tolerance. More precise tolerance may be preferred here to reduce the amount of movement allowed for the track tube 22 in the locked position, for reducing vibrations and unwanted rattling of the seat during usage, for example. The second piston portion 102 may be made at a larger standard tolerance relative to the lock housing 40, such as 0.01 inch, for example. The second piston portion 102 can be controlled with looser tolerances because the angled teeth can naturally have some self-aligning capabilities. The amount of rotational misalignment for the piston may depend on the length of the teeth. But so long as the teeth can start to engage, the angled sides of the teeth can rotate the piston to better or best alignment position, for example. The second piston portion 102 may have a rectangular shape with rounded corners. The flat sides 108 of the second piston portion 102 may slidably coupled to an interior slot 106 in the lock housing 40 adapted or configured for receiving the second piston portion 102, and also thereby providing rotational alignment for the piston 46.

Figure 14:
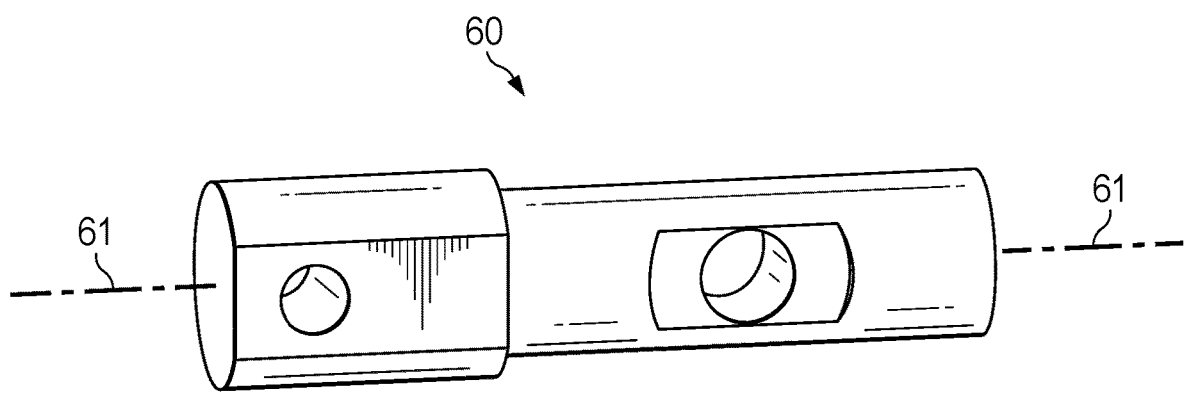
FIG. 14 is a perspective view of the shaft of FIGS. 8-10 according to some embodiments.

FIG. 14 is a perspective view of the shaft 60 of FIGS. 8-10 according to some embodiments. The shaft 60 may have holes and flat surfaces formed therein and thereon for alignment of the cam 56 and lever 62, and for providing screw or bolt holes for attaching the cam 56 and the lever 62 to the shaft 60. The shaft 60 may have a shaft axis 61 for which the shaft 60 pivots about during use or operation of the lock mechanism 20. The shaft 60 may be made of hardened stainless steel, for example. The shaft 60 may have a stepped shape with one or more radius sizes to fit with the cam 56, bushings 44, 45, and lever 62. The cam 56 and the lever 62 may be attached to the shaft 60 with screws, as illustrated in FIG. 6, for example. In some embodiments, the shaft 60, cam 56, and lever 62 are separate components. In some embodiments, any combination or any portion(s) of the shaft 60, cam 56, and lever 62 may be a single integral piece. For example, if the shaft 60, cam 56, and lever 62 are CNC machined from a billet block of material such that the shaft 60, cam 56, and lever 62 are a single integral piece, the lock housing 40 and the bushings 44, 45 may be split or structured to allow for insertion and assembly with such an integral cam shaft, for example.

Figure 15:
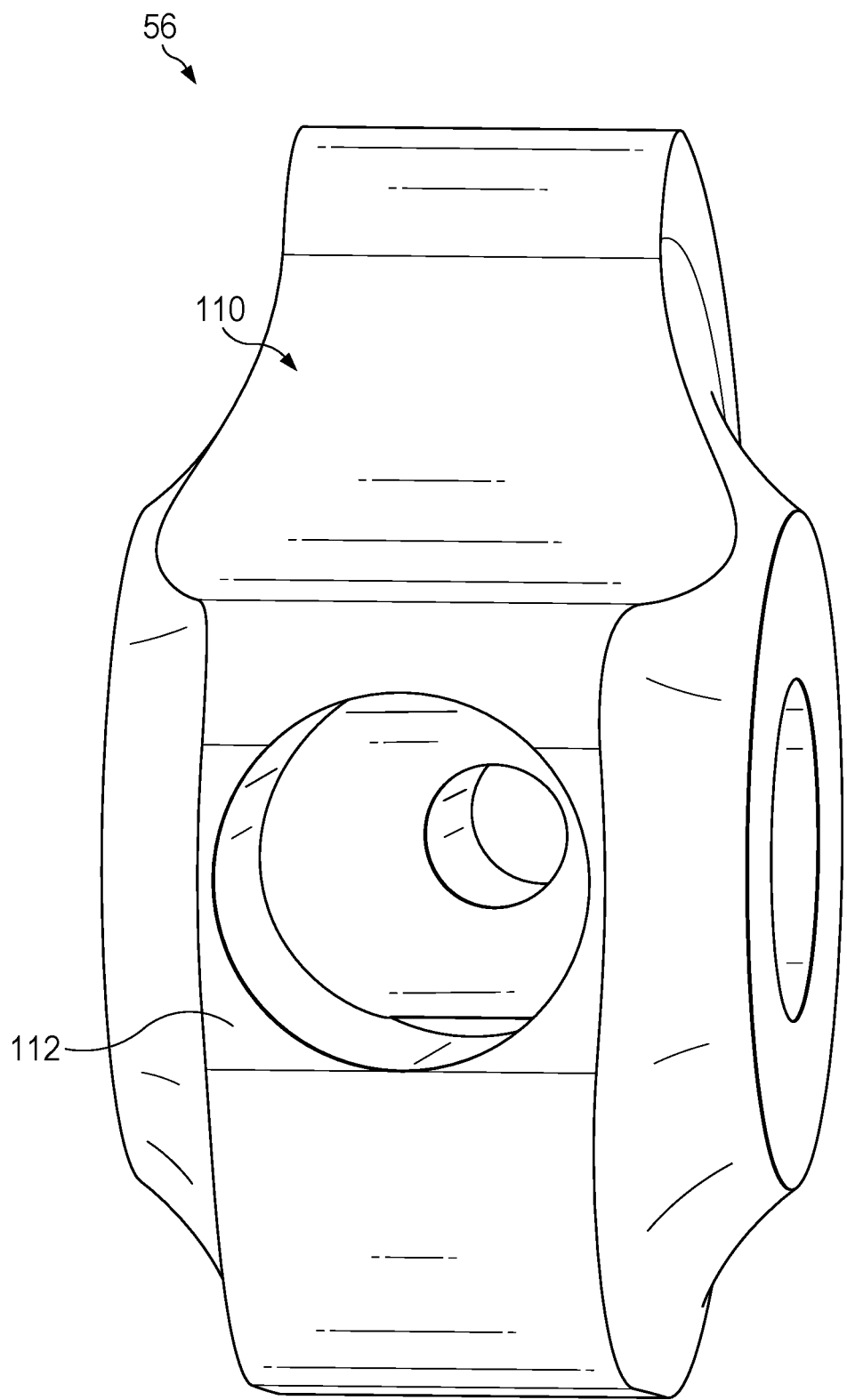
FIG. 15 is a perspective view of the cam of FIGS. 8-10 according to some embodiments.
Figure 16:
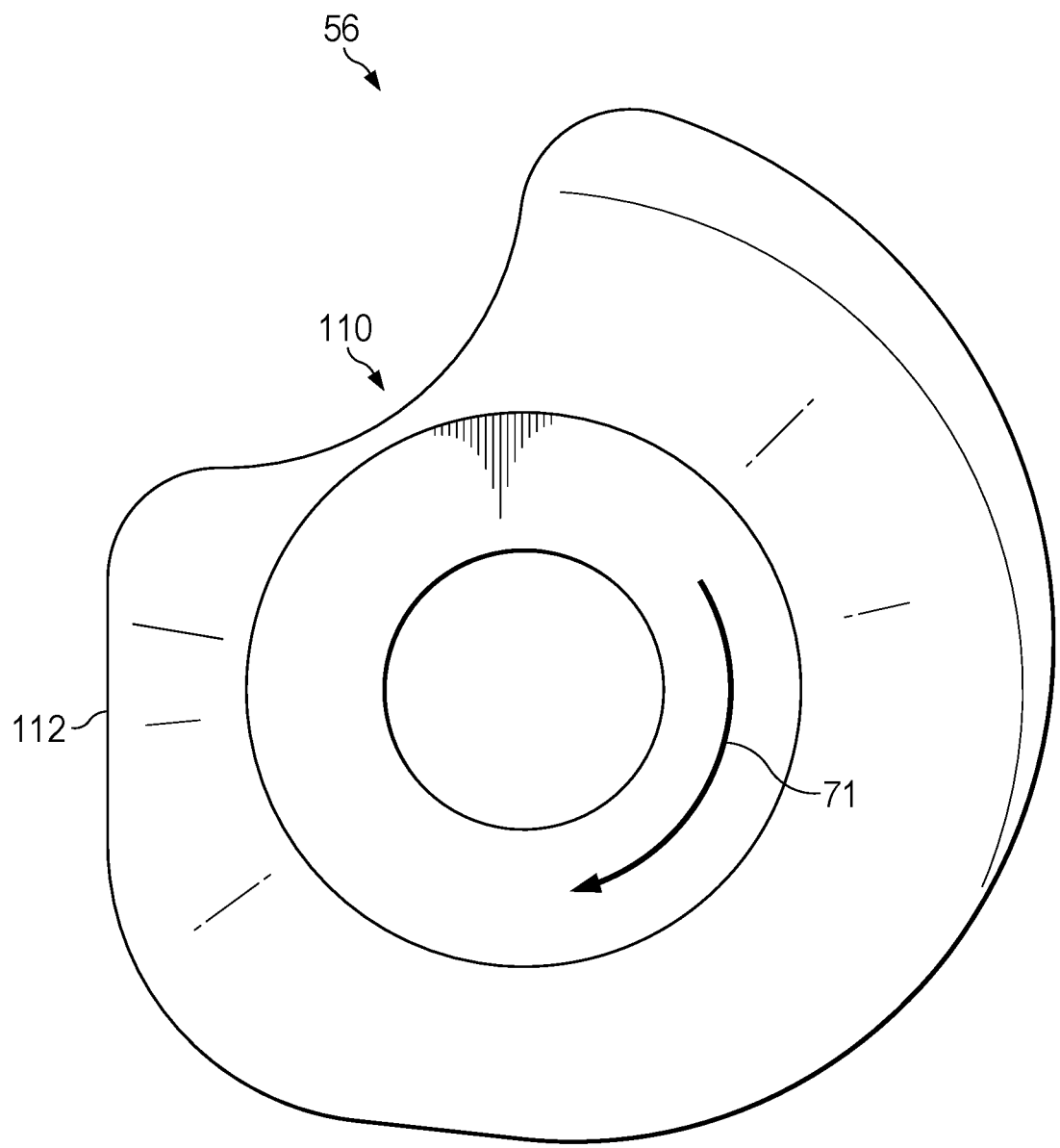
FIG. 16 is a side view of the cam of FIGS. 8-10 according to some embodiments.

FIG. 15 is a perspective view of the cam 56 of FIGS. 8-10 according to some embodiments. FIG. 16 is a side view of the cam 56 of FIGS. 8-10 according to some embodiments. The cam 56 may have a hole formed therein and through an intended pivot axis for the cam 56, which is adapted or configured to receive the shaft 60. The cam 56 may have holes, which may be through holes or blind holes or threaded holes, adapted or configured for receiving a screw or bolt for attaching the cam 56 to the shaft 60. The cam profile may be a spiral configuration with a steady or linearly increasing radius per pivot rotation of the cam 56, for example. The cam profile may have one or multiple rates of change of radius per pivot angle. The cam 56 may have portions including the cam profile used for engagement with the second distal end 92 of the piston 46 for controlling a motion of the piston 46. The cam 56 may have a large slot or groove 110 formed therein, as illustrated in FIG. 16, which may reduce weight of the cam 56 and which may make it easier for assembly, especially if the cam orientation is reversible. Also, the cam 56 may have a flat spot 112 at the location where a screw hole is formed. Such flat spot 112 may provide advantages in manufacturing and assembly by providing a flat surface for ease of alignment and orientation the cam 56. As illustrated in FIG. 15, the sides of the cam 56 may be chamfered or rounded to reduce weight of the cam 56, to ensure clearances, to reduce thrust or axial friction surfaces, or any combination thereof, for example. Also, such flat spot 112 on the cam 56 may be used as a visual indicator to see that the lock mechanism 20 in a locked position, such as for inspection or maintenance of the system.

The pivot axis of the cam 56 may be offset by about 0.04 inch relative to the point where the cam 56 contacts the piston 46. It may be preferred to minimize this offset because as the offset increases, the likelihood of back drive may increase due to the spiral geometry of the cam 56.

An advantage of having a symmetric cam design is that a same lock mechanism for one track or one track side of a seat may be also used on another track or another track side for an embodiment by simply flipping the cam 56. For example, a same lever actuator and linkage may be used to actuate two lock mechanisms on two different tracks by making one cam pivot clockwise for engagement and the other cam of another lock mechanism oriented an opposite way may pivot counter-clockwise for engagement, using the same selection of components and simply flipping the cam.

For some embodiments, the cam 56 may pivot about 45 degrees to go from a fully engaged position, for the piston 46 relative to the track tube 22, to a fully disengaged position, with the piston 46 sufficiently moved in the disengagement direction 74 to provide sufficient clearance to avoid interference with the track tube 22, even taking into account some margin for misalignments and flex of components. In some embodiments, the pivot range of the cam 56 may be as much as 90 degrees, for example, depending on the sizing, geometry, and kinematics of the lever 62, cam 56, cam profile, shaft 60, and piston 46.

For some embodiments, the cam profile may have a rate of change of radius of 0.005 inch per 5 degrees of cam pivot, and may be in a range of about 0.005 to 0.007 inch for rate of change of radius per 5 degrees of cam pivot, for example. As the rate of radius change per degree is increased, it may increase the likelihood of back drive.

In some embodiments, a track tube 22, a pillow block support 24, a swivel plate 26, a lock housing 40, a bushing 44, 45, a cam 56, a shaft 60, a lever 62, a slot insert, a cable pulley 80, any combination thereof, and any selection thereof, may be made from any suitable material or alternative materials, as a single integral piece or as a multi-piece component, such as steel, stainless steel, aluminum, titanium, bronze, brass, nickel, magnesium, carbon fiber reinforced polymers (CFRP), forged carbon composite, carbon nanotube composites (CNT), fiberglass reinforced polymers (FRP), glass fiber reinforced polymer (GFRP), aramid fiber composite, natural fiber composites, basalt fiber composite, metal matrix composite, woven composite, ceramic matrix composite (CMC), thermoplastic composites, various alloys thereof, various forgings thereof, or combinations thereof, for example.

In some embodiments, the bushings and/or bearings may be substituted or varied by any of a variety of supports or other alternative supports, such as metal bushings, hardened stainless steel bushings, bronze bushings, polytetrafluoroethylene (PTFE) bushings, solid bushings, split bushings, flanged bushings, thrust washers, needle roller bushings, roller bearing thrust washers, linear bushings, oil-impregnated bushings, self-lubricating bushings, tapered bushings, roller bearings, cylindrical roller bearings, tapered roller bearings, spherical roller bearings, needle bearings, thrust bearings, sleeve bearings, angular contact bearings, mounted bearings, spherical plain bearings, flexure bearings, or any combination thereof, for example.

In some embodiments, a track tube 22, a pillow block support 24, a swivel plate 26, a lock housing 40, a bushing 44, 45, a cam 56, a shaft 60, a lever 62, a slot insert, a cable pulley 80, any combination thereof, and any selection thereof, may be manufactured using any suitable manufacturing technique(s) or tool(s) or alternative technique(s), such as injection molding, thermal molding, casting, vacuum molding, forging, CNC, lathes, endmills, angled cutters, or any combination thereof, for example. In some embodiments, components may be permanently, releasably, or removably fixed, attached, assembled, or coupled together directly or with intervening components, seals, gaskets, or layers, using any suitable way or alternative ways, such as by using screws, bolts, rivets, adhesive, snaps, clips, clamps, press fit, hook-and-loop fasteners, latches and catches, bayonet, thermal bonding, crimping, threaded inserts, welding, or any combination thereof, for example.

Figure 17:
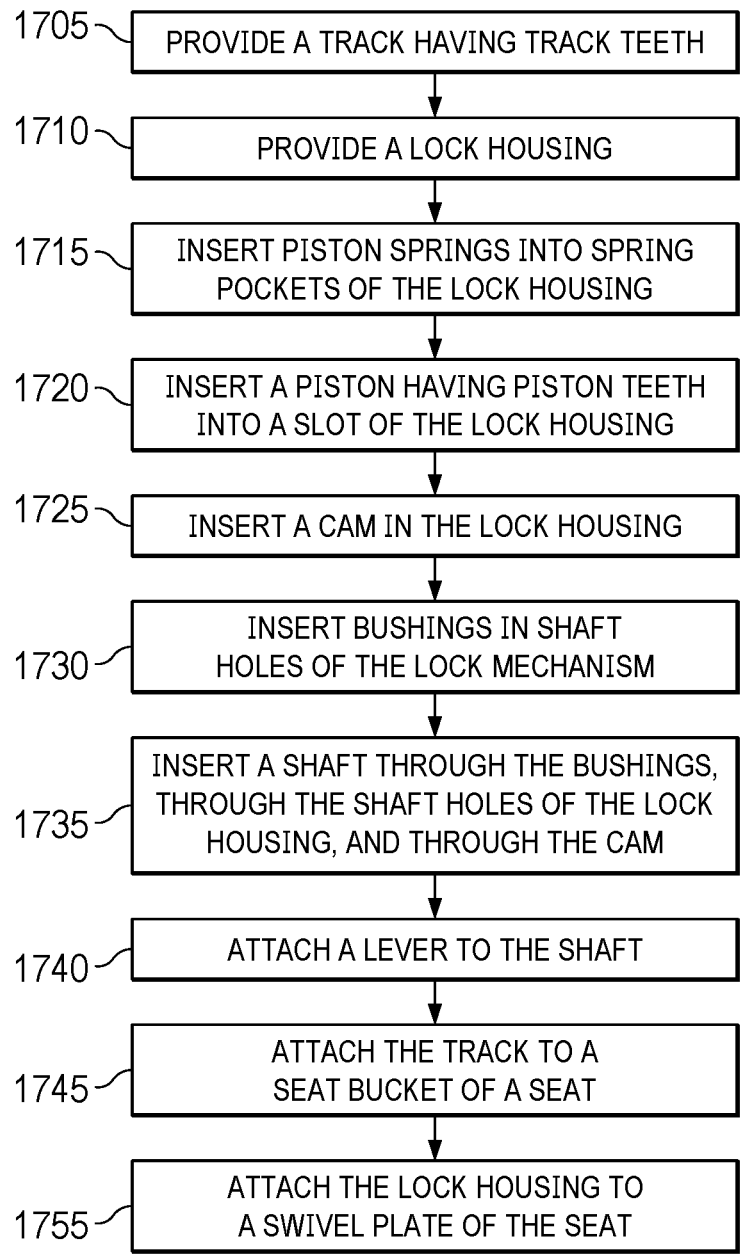
FIG. 17 is a flowchart illustrating a method for installing a position locking apparatus for a seat according to some embodiments.

FIG. 17 is a flowchart illustrating a method for installing a position locking apparatus 20 for a seat according to some embodiments. At operation 1705, a track tube 22, having a set of track teeth 48 disposed along a first side 31 of the track tube 22, may be provided. In some embodiments, the track tube 22 may be provided by sourcing, procurement, partial manufacturing of a sourced or procured part, full manufacturing, or some combination thereof, for example.

At operation 1710, a lock housing 40, having a slot 88, spring pockets 54, and shaft holes 41, 42 formed therein, may be provided. In some embodiments, the lock housing 40 may be provided by sourcing, procurement, partial manufacturing of a sourced or procured part, full manufacturing, or some combination thereof, for example.

At operation 1715, piston springs 51, 52 may be inserted into the spring pockets 54 of the lock housing 40. At operation 1720, a first distal end 91 of a piston 46 may be inserted into the slot 88 until a second distal end 92 of the piston 46 engages with the piston springs 51, 52. The piston 46 may include a set of piston teeth 50 disposed on the first distal end 91 of the piston 46, and the piston teeth 50 may be configured to engage with the track teeth 48. The piston 46 and the lock housing 40 may be configured to allow the piston 46 to slide in the slot 88 to engage the first distal end 91 of the piston 46 with the track tube 22 and to disengage the first distal end 91 of the piston 46 from the track tube 22 during operation or use of the locking mechanism 20.

At operation 1725, a cam may be inserted in the lock housing 40 between the first shaft hole 41 and the second shaft hole 42, and adjacent the second distal end 92 of the piston 46. The cam 56 may include a cam profile having an increasing radius per pivot angle in a first angular direction 71 about a shaft axis 61. The cam 56 and the cam profile may be configured to press the piston 46 towards the track tube 22 such that the set of piston teeth 50 engage with a subset of the set of track teeth 48 to lock a position of the track tube 22 relative to the piston 46 when the cam 56 is pivoted in the first angular direction 71 via a shaft 6o during operation or use of the locking mechanism 20.

At operation 1730, a first bushing 44 may be inserted in the first shaft hole 41, and a second bushing 45 may be inserted in the second shaft hole 42.

At operation 1735, the shaft 60 may be inserted through the first shaft hole 41, through the cam 56, and through the second shaft hole 42, such that the shaft 60 is pivotably coupled to the lock housing 40, such that the cam 56 is configured to contact the second distal end 92 of the piston 46, such that the first piston spring 51 is configured to bias the second distal end 92 of the piston 46 towards the cam 56 and to bias the first distal end 91 of the piston 46 away from the track tube 22 to disengage the first distal end 91 of the piston 46 from the track tube 22 during operation or use of the locking mechanism 20. More specifically, the shaft 60 may be inserted through the first bushing 44 and through the second bushing 45, such that the first bushing 44 is disposed between the shaft 60 and the first shaft hole 41, and such that the second bushing 45 is disposed between the shaft 60 and the second shaft hole 42.

In operation 1740, a lever 62 may be attached to the shaft 60, such that the lever 62 is configured to pivot the cam 56 via the shaft 60 in response to the lever 62 being pivoted about the shaft axis 61 during operation or use of the locking mechanism 20. In operation 1745, a lever spring 64 may be attached to the lever 62 such that the lever spring 64 is configured to bias pivoting of the cam 56 in the first angular direction 71 during operation or use of the locking mechanism 20. Depending on the placement, design, and orientation of the locking mechanism 20 according to some embodiments, the lever spring 64 may be placed on the shaft 60 before the lever 62 is attached to the shaft 60 and the attaching of the lever spring 64 may be done before, after, or while attaching the lever 62 to the shaft 60, for example.

In operation 1750, the track tube 22 may be attached to a seat bucket of a seat, such as an aircraft seat structure. In operation 1755, the lock housing 40 may be attached to a swivel plate 26 of the seat. In some embodiments, operation 1755 may be performed prior to, overlapping with, or simultaneous with operation 1750.

In some embodiments, such as a design where the lever 62 includes a cable pulley portion 80, a pull cable 82 may be attached to the cable pulley portion 80 of the lever 62, and the cable pulley portion 80 may be configured to guide the pull cable 82 relative to the lever 62. In some embodiments, such as a design that uses a linkage 66 in addition to or rather than a pull cable 82 to actuate the lever 62, the linkage 66 may be attached to a lever arm portion 68 of the lever 62.

According to some embodiments, the operations 1705 to 1755 may be sequentially performed, but are not necessarily sequentially performed. For example, the sequence of the operations may be changed, or at least two operations may be performed in parallel.

Some prior locking mechanisms for aircraft seats used locks that were held in place by wedging means instead of a cam. Such locks of prior mechanisms wedge in place due to a linear motion in the system. However, it is this linear motion that the locks may be intended to stop, and thus, by design, there may be some free play that occurs when the locks are engaged before the locks are effective. Additionally, as forces are increased on the linear rail, such forces along the track axis may push the locks away in a direction towards disengagement. Higher loads may push the locks away far enough that the lock disengages and skips, which allows linear motion in the rail. Such problems may be counteracted by adding spring force to hold the locks in the engaged position. However to unlock the system, this same spring force must be overcome resulting in higher input load requirements, such as higher handle forces by the user to disengage the locks.

Some embodiments may solve several problems often found in locking mechanisms for linear motion systems, such as some motion remaining or possible when locks are engaged. Some embodiments may eliminate free-play when the lock is engaged. Application of force on a linear guide rail may back-drive the lock. Some embodiments may eliminate, reduce, or significantly reduce back-drive on the lock. In prior systems, relatively high forces are required to engage and hold a lock in place. Some embodiments may merely use relatively low forces to engage and hold the lock in place. These advantages and many others may be realized through use of some embodiments of the present disclosure.

Some embodiments may include a linear rail with locking features such as serrations or teeth 48, a piston 46 with locking features such as piston teeth 50 that match the linear rail, a cam 56 used to push the piston 46 into the rail track tube 22, springs 51, 52, 64 that control the position of the cam 56 and piston 46, and a housing 40 that holds the assembly components together. An input force may be used to rotate the cam 56, and such input force may be applied in a number of ways, such as mechanically, electronically, or a combination thereof. In some embodiments, the lock mechanism 20 may be set up to be normally locked or normally unlocked, determined by the installed direction of the cam spring or lever spring 64 and orientation of the cam profile, for example.

The cam 56 may look similar to a single lobe on an engine camshaft where the distance from the rotation axis of the cam 56 gradually increases and decreases as the cam pivots or rotates. The cam 56 may rotate on a shaft 60 that is held in place by the housing 40. A lever spring 64 may return the cam 56 to a nominal position, such as a locked position. The lock piston 46 may be held in place by the housing 40, which allows the lock piston 46 to ride on the cam profile moving the lock piston 46 to and from the rail track tube 22 as the cam 56 is rotated and returned. Springs 51, 52 may hold the piston 46 against the cam profile so that the position of the piston 46 is determined by the rotation of the cam 56 or the pivotal position of the cam 56.

The rail track tube 22 may be held in place either by the housing 40 or other structure(s) that allow the rail track tube 22 to move linearly. In a nominal position, such as a locked position, the cam spring or lever spring 64 may rotate the cam 56 to push the piston 46 into the rail track tube 22, engaging the locking features such as teeth 48, 50 and eliminating relative motion. When the cam 56 is rotated the lock springs or piston springs 51, 52 push the lock piston 46 towards the cam 56, which allows the lock piston 46 to follow the cam profile that moves the piston 46 away from the rail track tube 22 thus allowing the linear motion of the rail track tube 22. Removing the input force on the lever 62 may result in the cam spring or lever spring 64 moving the cam 56 and lock piston 46 back to the locked position. The cam 56 may be able to continue to rotate until the lock piston 46 is or piston teeth 50 are fully seated, ensuring that the lock piston 46 is fully effective under varying part and assembly tolerances. The cam profile when rotated prior to, at, and after the nominal locked position may have a shallow ramp rate ensuring that back-driving forces from the rail track tube 22 to the lock piston 46, via the rail teeth 48 and piston teeth 50, do not turn the cam 56 backwards in a manner to loosen or unlock the lock mechanism 20.

Some embodiments are a lock to stop motion in a linear guide system. In some embodiments, a linear rail track tube 22 has serrations or teeth 48 that match serrations or piston teeth 50 on a lock piston 46. When not engaged, the lock piston 46 and rail track tube 22 may be mounted separately so that there is relative linear motion between the lock piston 46 and the rail track tube 22. When engaged, the lock serrations piston teeth 50 may be pushed into the rail serrations or teeth 48 via a cam 56, which thereby stops all relative linear motion between the lock piston 46 and the rail track tube 22.

Some embodiments of the present disclosure may have wide ranging uses across multiple industries for assemblies using linear rails, such as executive passenger seats for airplanes. The seats may have the ability to move laterally and fore and aft on a linear rail system. The purpose of the ability to move the seat may be for passenger comfort and adjustment of the seat position. The locks of some embodiments may be used to hold the seat in place when the motion is unwanted. Such seats may be tested and used in high g-force, crash, and maneuvering applications, and the locks of some embodiments may react to loads directly resulting from such situations.

Some embodiments of the present disclosure may be used in a number of industries where motion guide rails are used, such as overhead transport systems and gantries, CNC machines, 3D printers. robotics, and automation machines, for example.

An embodiment position locking apparatus for a seat includes a track, a lock housing, a piston, a shaft, and a cam. In the embodiment, the track extends along a track axis and has a set of track teeth disposed along a first side of the track. In the embodiment, the lock housing has a slot formed therein. In the embodiment, the piston has a first distal end and a second distal end, a set of piston teeth is disposed on the first distal end of the piston, and the piston is configured to slide in the slot to engage the first distal end of the piston with the track and engage the piston teeth with the track teeth and further configured to disengage the first distal end of the piston from the track. In the embodiment, the shaft extends along a shaft axis, and the shaft is pivotably coupled to the lock housing. In the embodiment, the cam is attached to the shaft, the cam is adjacent the second distal end of the piston, the cam is configured to contact the second distal end of the piston, and the cam is configured to press the piston towards the track such that the set of piston teeth engage with a subset of the set of track teeth to lock a position of the track relative to the piston in response to the cam being pivoted in a first angular direction about the shaft axis via the shaft.

In some embodiments, the position locking apparatus further includes a lever connected to, and extending from, the shaft, and the lever is configured to pivot the cam via the shaft in response to the lever being pivoted about the shaft axis. In some embodiments, the position locking apparatus further includes a lever spring configured to bias pivoting of the cam in the first angular direction. In some embodiments, the lever includes a cable pulley configured to attach a pull cable to the lever and to guide the pull cable relative to the lever. In some embodiments, the lever includes a lever arm configured to attach a linkage to a distal end of the lever arm. In some embodiments, the shaft, the cam, and the lever are separate components, the cam is removably fixed to the shaft, and the lever is removably fixed to the shaft.

In some embodiments, the position locking apparatus further includes a first piston spring and a second piston spring, each disposed between the piston and the lock housing, and the first piston spring and second piston spring each being configured to bias the second distal end of the piston towards the cam and to bias the first distal end of the piston away from the track to disengage the first distal end of the piston from the track. In some embodiments, the piston includes a first piston portion extending laterally in a first direction at the second distal end of the piston, the piston includes a second piston portion extending laterally in a second direction at the second distal end of the piston, the second direction being opposite of the first direction, the piston includes a third piston portion configured to slide in the slot and extending to the first distal end of the piston, the first piston spring presses against the first piston portion and extends adjacent the third piston portion, the second piston spring presses against the second piston portion and extends adjacent the third piston portion, and the first piston spring is separated from the second piston spring by a spaced distance.

In some embodiments, the slot includes a circular slot cross-section, the third piston portion includes a circular piston cross-section, and the circular slot cross-section has a larger diameter than the circular piston cross-section. In some embodiments, the piston is configured to slide in the slot along a piston axis, the piston axis is generally perpendicular to the track axis, and the shaft axis is generally perpendicular to the piston axis.

In some embodiments, the position locking apparatus further includes a first shaft hole in the lock housing, a second shaft hole in the lock housing, a first bushing disposed in the first shaft hole, and a second bushing disposed in the second shaft hole. In some embodiments, the shaft extends through the first bushing, the first shaft hole, the second bushing, and the second shaft hole. In some embodiments, the first bushing is disposed between the shaft and the first shaft hole, the second bushing is disposed between the shaft and the second shaft hole, the first shaft hole is separated from the second shaft hole by a first spaced distance along the shaft axis, the first bushing is separated from the second bushing by a second spaced distance along the shaft axis, and the cam is disposed between the first shaft hole and the second shaft hole.

An embodiment rail lock apparatus includes a rail, a lock housing, a lock piston, a shaft, a lock cam, a first lock piston spring, a lever, and a lever spring. In the embodiment, the rail has rail teeth formed on a first side of the rail. In the embodiment, the lock piston slidably couples with, and is supported by, the lock housing. In the embodiment, the lock piston has teeth formed on a distal end of the lock piston. In the embodiment, the shaft pivotably couples with, and is supported by, the lock housing. In the embodiment, the lock cam mechanically couples to the shaft. In the embodiment, the first lock piston spring is disposed between the lock piston and the lock housing, and the first lock piston spring is configured to press the lock piston against the lock cam. In the embodiment, the lever is mechanically coupled to the shaft, such that the shaft, the lock cam, and the lever are fixed relative to each other. In the embodiment, the lever spring is disposed to provide spring bias to the lever to pivot the lock cam, via the shaft and via the lever, toward a locked position with the lock piston teeth engaging the rail teeth.

In some embodiments, the lock cam includes a cam profile having an increasing radius per pivot angle. In some embodiments, the lever includes a cable pulley portion, and the cable pully portion is configured to attach and receive a pull cable. In some embodiments, the lever includes a lever arm configured for attachment of a linkage thereto.

An embodiment method for installing a position locking apparatus for a seat includes providing a track having a track axis, the track having a set of track teeth disposed along a first side of the track, providing a lock housing having a slot formed therein, a first shaft hole formed therein, a second shaft hole formed therein, and a first spring pocket formed therein, inserting a first piston spring into the first spring pocket, inserting a first distal end of a piston into the slot until a second distal end of the piston engages with the first piston spring, where the piston includes a set of piston teeth disposed on the first distal end of the piston, where the piston teeth are configured to engage with the track teeth, and where the piston and the lock housing are configured to allow the piston to slide in the slot to engage the first distal end of the piston with the track and to disengage the first distal end of the piston from the track, inserting a cam in the lock housing between the first shaft hole and the second shaft hole, and adjacent the second distal end of the piston, where the cam includes a cam profile having an increasing radius per pivot angle in a first angular direction about a shaft axis, where the cam and the cam profile are configured to press the piston towards the track to cause the set of piston teeth to engage with a subset of the set of track teeth to lock a position of the track relative to the piston in response to the cam being pivoted in the first angular direction via a shaft, inserting the shaft through the first shaft hole, through the cam, and through the second shaft hole, such that the shaft is pivotably coupled to the lock housing, such that the cam is configured to contact the second distal end of the piston, such that the first piston spring is configured to bias the second distal end of the piston towards the cam and to bias the first distal end of the piston away from the track to disengage the first distal end of the piston from the track, and attaching a lever to the shaft, the lever being configured to pivot the cam via the shaft in response to the lever being pivoted about the shaft axis.

In some embodiments, a method for installing a position locking apparatus for a seat further includes inserting a first bushing in the first shaft hole, and inserting a second bushing in the second shaft hole, where the inserting of the shaft through the first shaft hole, through the cam, and through the second shaft hole, further includes inserting the shaft through the first bushing and through the second bushing, such that the first bushing is disposed between the shaft and the first shaft hole, and such that the second bushing is disposed between the shaft and the second shaft hole.

In some embodiments, a method for installing a position locking apparatus for a seat further includes inserting a second piston spring into a second spring pocket formed in the lock housing, and where the inserting of the first distal end of the piston into the slot is also until the second distal end of the piston engages with the second piston spring. In some embodiments, a method for installing a position locking apparatus for a seat further includes attaching a lever spring to the lever such that the lever spring is configured to bias pivoting of the cam in the first angular direction. In some embodiments, a method for installing a position locking apparatus for a seat further includes attaching a pull cable to a cable pulley portion of the lever, where the cable pulley portion is configured to guide the pull cable relative to the lever.

In some embodiments, a method for installing a position locking apparatus for a seat further includes attaching a linkage to a lever arm portion of the lever. In some embodiments, a method for installing a position locking apparatus for a seat further includes attaching the track to a seat bucket of the seat, and attaching the lock housing to a swivel plate of the seat.

While illustrative embodiments have been described with reference to illustrative drawings, this description is not intended to be construed in a limiting sense. Various modifications and combinations of the illustrative embodiments, as well as other embodiments, may be apparent to persons skilled in the pertinent art upon referencing the present disclosure. It is therefore intended that the appended claims encompass any and all of such modifications or embodiments.

What is claimed is:

1. A position locking apparatus for a seat, comprising:
a track extending along a track axis and having a set of track teeth disposed along a first side of the track;
a lock housing having a slot formed therein;
a piston having a first distal end and a second distal end, wherein a set of piston teeth is disposed on the first distal end of the piston, the piston being configured to slide in the slot to engage the first distal end of the piston with the track and engage the piston teeth with the track teeth and further configured to disengage the first distal end of the piston from the track;
a shaft extending along a shaft axis, the shaft being pivotably coupled to the lock housing; and
a cam attached to the shaft, the cam being adjacent the second distal end of the piston, the cam being configured to contact the second distal end of the piston, and the cam being configured to press the piston towards the track such that the set of piston teeth engage with a subset of the set of track teeth to lock a position of the track relative to the piston in response to the cam being pivoted in a first angular direction about the shaft axis via the shaft.

2. The apparatus of claim 1, further comprising:
a lever connected to, and extending from, the shaft, the lever being configured to pivot the cam via the shaft in response to the lever being pivoted about the shaft axis; and
a lever spring configured to bias pivoting of the cam in the first angular direction.

3. The apparatus of claim 2, wherein the lever comprises a cable pulley configured to attach a pull cable to the lever and to guide the pull cable relative to the lever.

4. The apparatus of claim 2, wherein the lever comprises a lever arm configured to attach a linkage to a distal end of the lever arm.

5. The apparatus of claim 2, wherein the shaft, the cam, and the lever are separate components, wherein the cam is removably fixed to the shaft, and wherein the lever is removably fixed to the shaft.

6. The apparatus of claim 1, further comprising:
a first piston spring and a second piston spring, each disposed between the piston and the lock housing, the first piston spring and second piston spring each being configured to bias the second distal end of the piston towards the cam and to bias the first distal end of the piston away from the track to disengage the first distal end of the piston from the track;
wherein the piston comprises a first piston portion extending laterally in a first direction at the second distal end of the piston;
wherein the piston comprises a second piston portion extending laterally in a second direction at the second distal end of the piston, the second direction being opposite of the first direction;
wherein the piston comprises a third piston portion configured to slide in the slot and extending to the first distal end of the piston;
wherein the first piston spring presses against the first piston portion and extends adjacent the third piston portion;
wherein the second piston spring presses against the second piston portion and extends adjacent the third piston portion; and
wherein the first piston spring is separated from the second piston spring by a spaced distance.

7. The apparatus of claim 6, wherein the slot comprises a circular slot cross-section, wherein the third piston portion comprises a circular piston cross-section, and wherein the circular slot cross-section has a larger diameter than the circular piston cross-section.

8. The apparatus of claim 1, wherein the piston is configured to slide in the slot along a piston axis, wherein the piston axis is generally perpendicular to the track axis, and wherein the shaft axis is generally perpendicular to the piston axis.

9. The apparatus of claim 1, further comprising:
a first shaft hole in the lock housing;
a second shaft hole in the lock housing;
a first bushing disposed in the first shaft hole; and
a second bushing disposed in the second shaft hole;
wherein the shaft extends through the first bushing, the first shaft hole, the second bushing, and the second shaft hole;
wherein the first bushing is disposed between the shaft and the first shaft hole;
wherein the second bushing is disposed between the shaft and the second shaft hole;
wherein the first shaft hole is separated from the second shaft hole by a first spaced distance along the shaft axis;
wherein the first bushing is separated from the second bushing by a second spaced distance along the shaft axis; and
wherein the cam is disposed between the first shaft hole and the second shaft hole.

10. A rail lock apparatus, comprising:
a rail having rail teeth formed on a first side of the rail;
a lock housing;
a lock piston slidably coupled with, and supported by, the lock housing, and the lock piston having teeth formed on a distal end of the lock piston;
a shaft pivotably coupled with, and supported by, the lock housing;
a lock cam mechanically coupled to the shaft;
a first lock piston spring disposed between the lock piston and the lock housing, the first lock piston spring being configured to press the lock piston against the lock cam;
a lever mechanically coupled to the shaft, such that the shaft, the lock cam, and the lever are fixed relative to each other; and
a lever spring disposed to provide spring bias to the lever to pivot the lock cam, via the shaft and via the lever, toward a locked position with the lock piston teeth engaging the rail teeth.

11. The apparatus of claim 10, wherein the lock cam comprises a cam profile having an increasing radius per pivot angle.

12. The apparatus of claim 10, wherein the lever comprises a cable pulley portion, the cable pully portion being configured to attach and receive a pull cable.

13. The apparatus of claim 10, wherein the lever comprises a lever arm configured for attachment of a linkage thereto.

14. A method for installing a position locking apparatus for a seat, comprising:
providing a track having a track axis, the track having a set of track teeth disposed along a first side of the track;
providing a lock housing having a slot formed therein, a first shaft hole formed therein, a second shaft hole formed therein, and a first spring pocket formed therein;

inserting a first piston spring into the first spring pocket;

inserting a first distal end of a piston into the slot until a second distal end of the piston engages with the first piston spring, wherein the piston comprises a set of piston teeth disposed on the first distal end of the piston, wherein the piston teeth are configured to engage with the track teeth, and wherein the piston and the lock housing are configured to allow the piston to slide in the slot to engage the first distal end of the piston with the track and to disengage the first distal end of the piston from the track;

inserting a cam in the lock housing between the first shaft hole and the second shaft hole, and adjacent the second distal end of the piston, wherein the cam comprises a cam profile having an increasing radius per pivot angle in a first angular direction about a shaft axis, wherein the cam and the cam profile are configured to press the piston towards the track to cause the set of piston teeth to engage with a subset of the set of track teeth to lock a position of the track relative to the piston in response to the cam being pivoted in the first angular direction via a shaft;

inserting the shaft through the first shaft hole, through the cam, and through the second shaft hole, such that the shaft is pivotably coupled to the lock housing, such that the cam is configured to contact the second distal end of the piston, such that the first piston spring is configured to bias the second distal end of the piston towards the cam and to bias the first distal end of the piston away from the track to disengage the first distal end of the piston from the track; and attaching a lever to the shaft, the lever being configured to pivot the cam via the shaft in response to the lever being pivoted about the shaft axis.

15. The method of claim 14, further comprising:

inserting a first bushing in the first shaft hole; and inserting a second bushing in the second shaft hole, wherein the inserting of the shaft through the first shaft hole, through the cam, and through the second shaft hole, further comprises inserting the shaft through the first bushing and through the second bushing, such that the first bushing is disposed between the shaft and the first shaft hole, and such that the second bushing is disposed between the shaft and the second shaft hole.

16. The method of claim 14, further comprising inserting a second piston spring into a second spring pocket formed in the lock housing, and wherein the inserting of the first distal end of the piston into the slot is also until the second distal end of the piston engages with the second piston spring.

17. The method of claim 14, further comprising attaching a lever spring to the lever such that the lever spring is configured to bias pivoting of the cam in the first angular direction.

18. The method of claim 14, further comprising attaching a pull cable to a cable pulley portion of the lever, wherein the cable pulley portion is configured to guide the pull cable relative to the lever.

19. The method of claim 14, further comprising attaching a linkage to a lever arm portion of the lever.

20. The method of claim 14, further comprising:

attaching the track to a seat bucket of the seat; and attaching the lock housing to a swivel plate of the seat.

* * * * *